United States Patent
Fujikawa et al.

(10) Patent No.: US 7,108,656 B2
(45) Date of Patent: Sep. 19, 2006

(54) ENDOSCOPE APPARATUS

(75) Inventors: Shinji Fujikawa, Hachioji (JP); Kiyoshi Hiyake, Asaka (JP); Nobuyuki Motoki, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 260 days.

(21) Appl. No.: 10/633,675

(22) Filed: Aug. 5, 2003

(65) Prior Publication Data
US 2004/0158128 A1    Aug. 12, 2004

(30) Foreign Application Priority Data

Aug. 6, 2002 (JP) ............................. 2002-228388
Sep. 6, 2002 (JP) ............................. 2002-261747

(51) Int. Cl.
*A61B 1/00* (2006.01)
(52) U.S. Cl. ...................................... 600/102; 206/363
(58) Field of Classification Search ................ 600/102; 206/363
See application file for complete search history.

(56) References Cited

U.S. PATENT DOCUMENTS

| | | | |
|---|---|---|---|
| 4,913,369 A | 4/1990 | Lia et al. | |
| 5,314,070 A | 5/1994 | Ciarlei | |
| 5,323,899 A | 6/1994 | Strom et al. | |
| 5,863,286 A * | 1/1999 | Yabe et al. | 600/121 |
| 6,066,089 A * | 5/2000 | Costello et al. | 600/102 |
| 6,846,285 B1* | 1/2005 | Hasegawa et al. | 600/102 |

FOREIGN PATENT DOCUMENTS

| | | |
|---|---|---|
| JP | 58-172905 | 11/1983 |
| JP | 2001-264643 A | 9/2001 |

* cited by examiner

*Primary Examiner*—Linda C. M. Dvorak
*Assistant Examiner*—Matthew J. Kasztejna
(74) *Attorney, Agent, or Firm*—Dickstein, Shapiro, LLP.

(57) ABSTRACT

The present invention provides an endoscope comprising an elongated insert portion having flexibility, the insert portion being inserted into a space targeted for inspection, a connector portion linked with a proximal end side of the insert portion and having a unit which controls flexible bending and image acquisition of the insert portion mounted thereon, an apparatus main body which controls the connector portion, and an endoscope housing case which houses the insert portion and connector portion and the apparatus main body therein, the endoscope apparatus having an insert portion housing member in which the endoscope main body having the connector portion and apparatus main body assembled with each other is attachable to/detachable from the endoscope housing case, and which is attachable to/detachable from the endoscope main body while the insert portion is held.

7 Claims, 21 Drawing Sheets

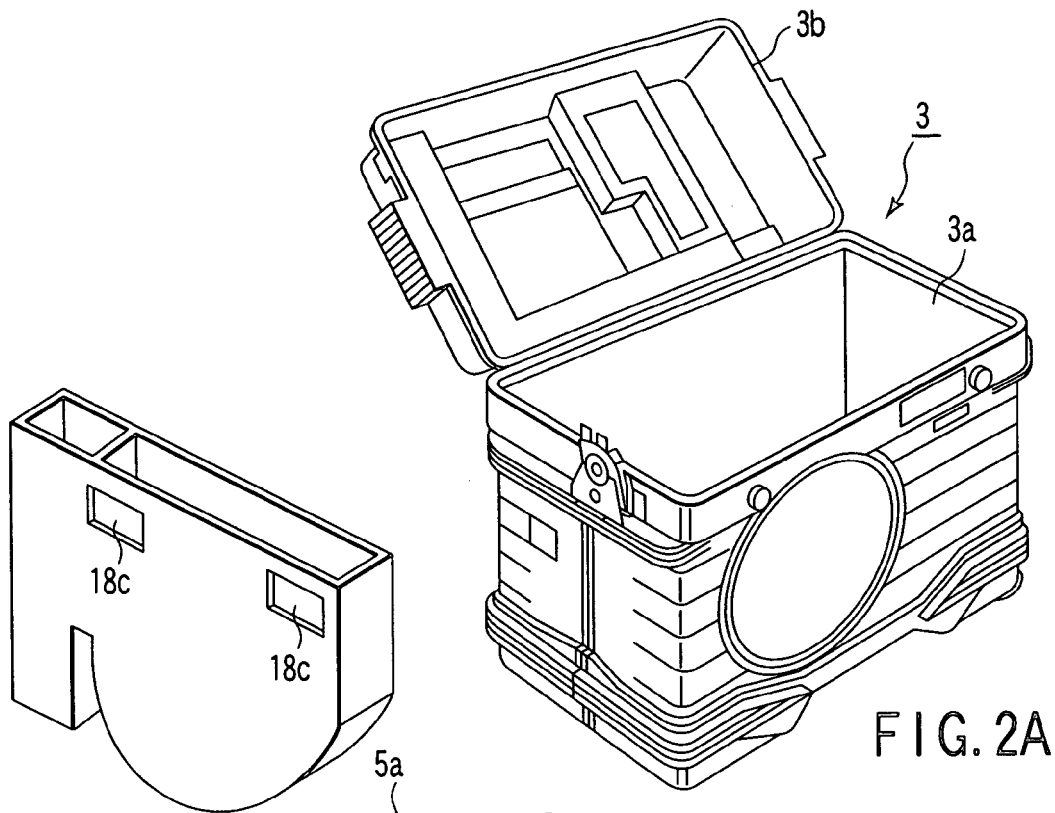
FIG. 2A
FIG. 2C
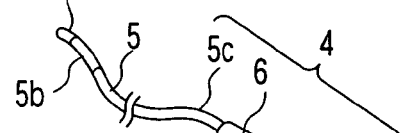
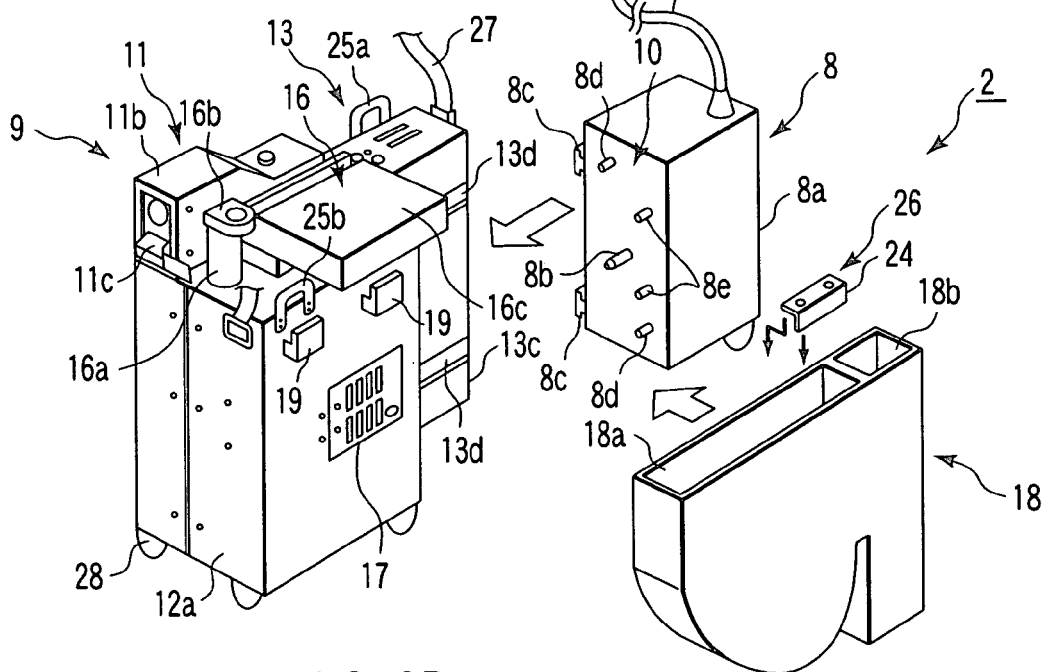
FIG. 2B

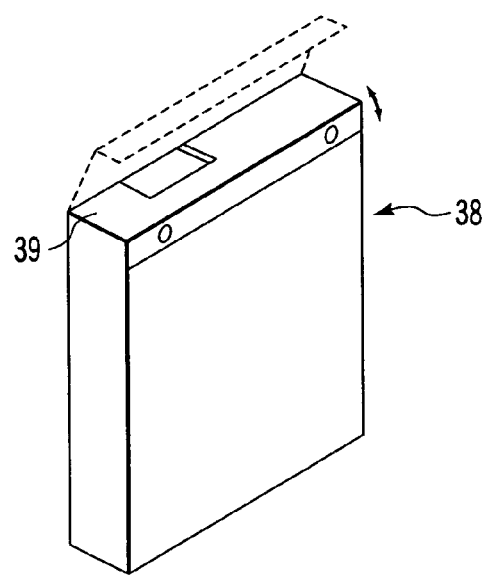 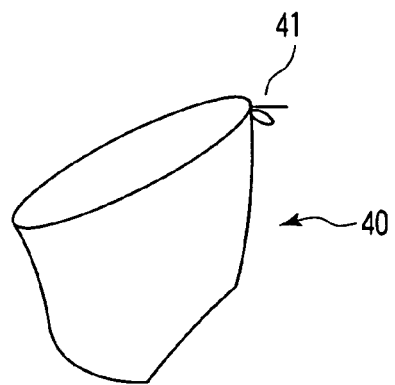
FIG. 8A          FIG. 8B
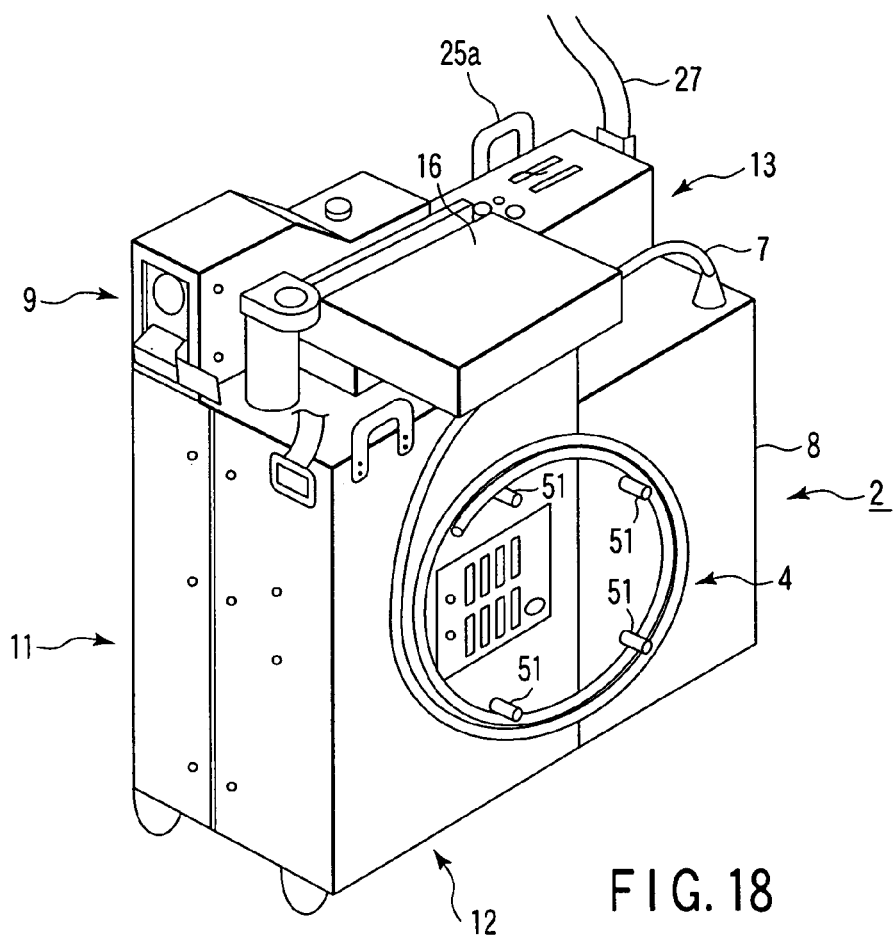
FIG. 18

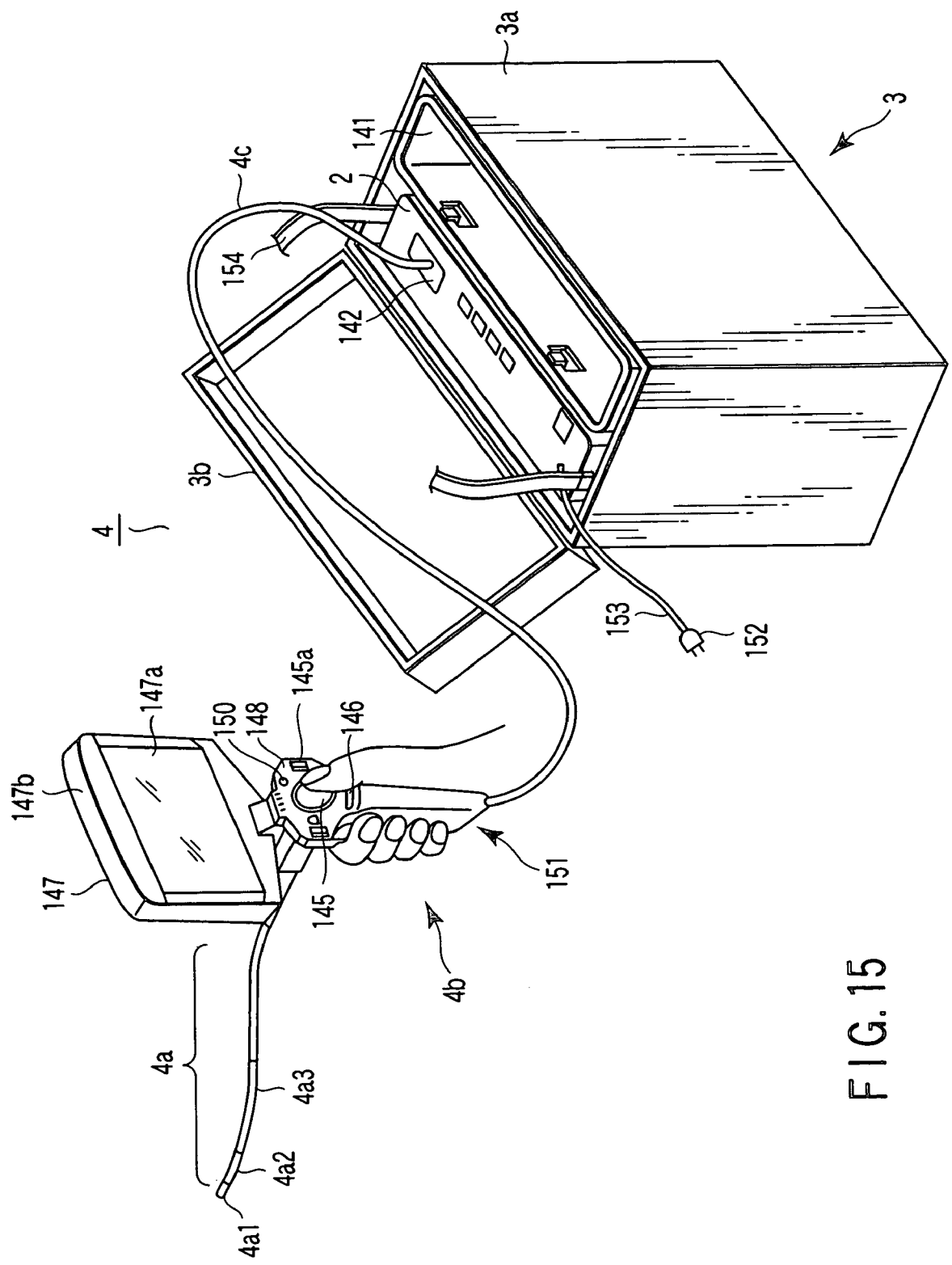
F I G. 15

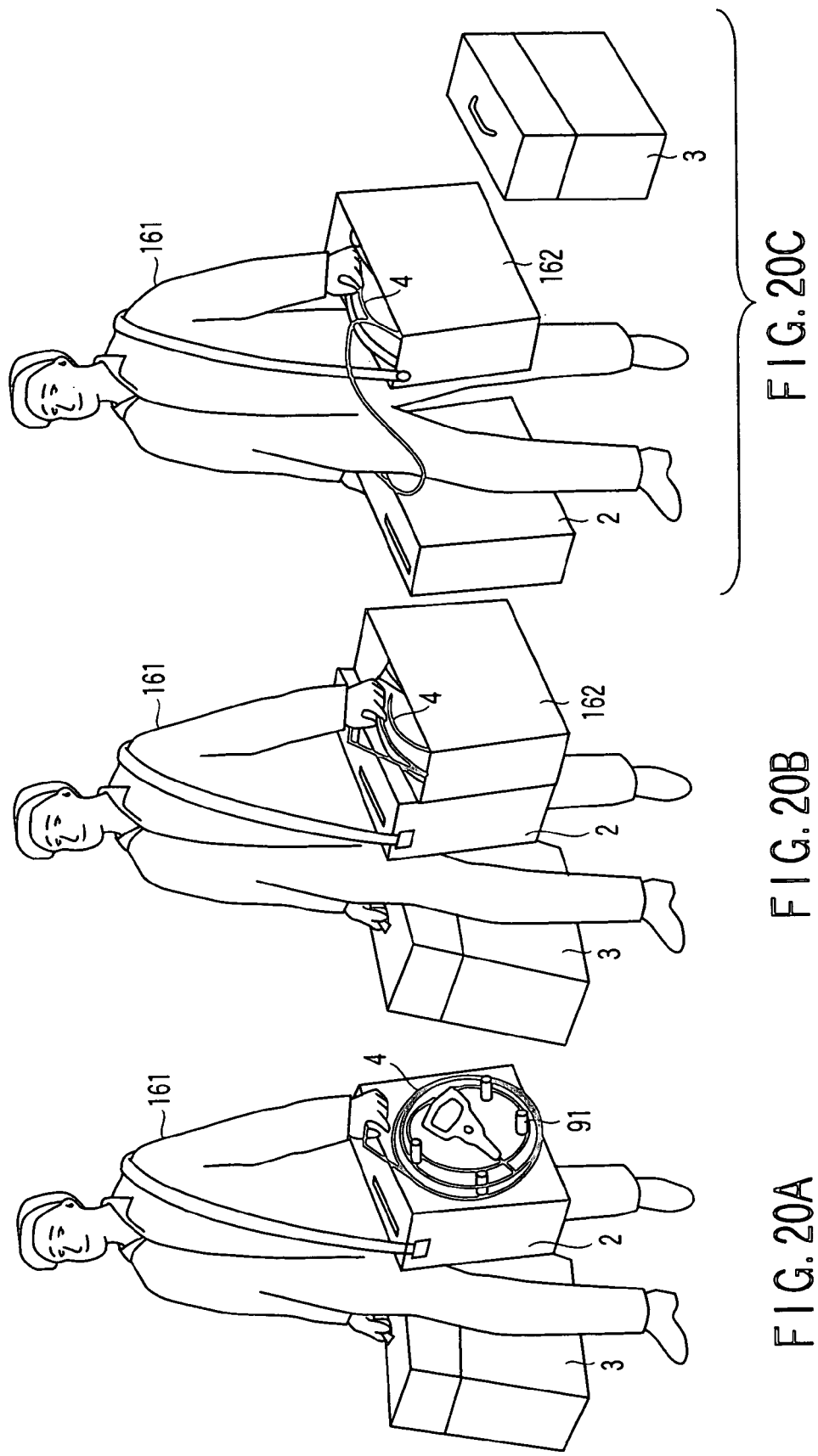

ENDOSCOPE APPARATUS

CROSS-REFERENCE TO RELATED APPLICATIONS

This application is based upon claims the benefit of priority from the Japanese Patent Application No. 2002-228388, filed Aug. 6, 2002; No. 2002-261747, filed Sep. 6, 2002, the entire contents of which are incorporated herein by reference.

BACKGROUND OF THE INVENTION

The present invention relates to an endoscope apparatus mainly used in the industrial field, the endoscope apparatus being inserted into a space targeted for inspection, such as an inside of a pipe, to observe a site or an internal state.

In general, as an endoscope apparatus for industrial use, there may be used an endoscope apparatus comprising an elongated insert portion so as to enable endoscopic inspection of a deep part of plant, for example. In this case, it is poor in usability to carry such an elongated insert portion in its original state.

For example, in Jpn. Pat. Appln. KOKAI Publication No. 2001-264643, there is disclosed a drum type endoscope apparatus used by providing a drum for winding an elongated insert portion in an endoscope housing case which houses an endoscope apparatus main body therein, winding the elongated insert portion around the drum, and pulling out the required insert portion. In this endoscope apparatus, the drum for housing the insert portion in the endoscope housing case is provided, and thus, an operation for housing the insert portion in the endoscope housing case is simple. However, in this configuration, when the housing of a drum portion is taken into account, the simplification of the internal configuration of the endoscope housing case and the reduction of a drum mechanism itself must be achieved.

In addition, in U.S. Pat. No. 5,314,070, there is disclosed an endoscope apparatus comprising an endoscope housing case that houses an endoscope apparatus main body therein. A housing portion of an insert portion is assembled integrally with this endoscope housing case. Further, in this apparatus, the endoscope apparatus main body including an endoscope insert portion and an insert portion casing linked with a proximal end part of this insert portion can be used by removing it from the endoscope housing case. However, in this apparatus, the housing portion of the insert portion is formed integrally with a case, and thus, the case and insert portion must be housed after they are combined with each other.

BRIEF SUMMARY OF THE INVENTION

It is an object of the present invention to provide an endoscope apparatus in which an endoscope apparatus main body can be easily carried by housing it in an endoscope housing case; and an insert portion is carried in a state in which the insert portion is held in an insert portion holding member, thereby making it possible to prevent the insert portion from being damaged at the time of transport.

In order to achieve the above described object, according to the present invention, there is provided an endoscope apparatus comprising: an endoscope main body which comprises an elongated insert portion having flexibility, the elongated portion being inserted into at least a space targeted for inspection, and an apparatus main body used in combination with the insert portion; an endoscope housing case which houses the endoscope main body therein; and an insert portion holding member to hold the insert portion, the holding member being attachable to/detachable from the endoscope housing case together with the endoscope main body.

According to the endoscope apparatus of the present invention, the endoscope main body having the insert portion casing and the apparatus main body assembled with each other is removed from the endoscope housing case, and is carried in place where the endoscope apparatus is used. Further, the insert portion holding member for holding a scope unit is provided detachably to the endoscope main body. Then, the insert portion holding member and endoscope main body are carried integrally. Alternatively, although it is independent of the endoscope main body, the insert portion is carried in a state in which it is held by the insert portion holding member.

BRIEF DESCRIPTION OF THE SEVERAL VIEWS OF THE DRAWING

FIG. 2A is a perspective view showing an endoscope housing case in the endoscope apparatus for industrial use according to the first embodiment;

FIG. 2B is an exploded perspective view showing an endoscope main body of the endoscope apparatus main body;

FIG. 2C is a perspective view showing a hole for mounting a housing portion on the apparatus main body;

FIG. 8A is a perspective view showing a sixth modified example of the insert portion housing portion of the endoscope apparatus for industrial use according to the first embodiment;

FIG. 8B is a perspective view showing a seventh modified example of the same;

FIG. 15 is a view showing a fifth modified example of the endoscope apparatus for industrial use according to the first embodiment;

FIG. 18 is a perspective view of essential portions showing an endoscope apparatus for industrial use according to a second embodiment of the present invention;

FIGS. 20A, 20B, and 20C are views each showing a mode of using the endoscope apparatus for industrial use according to the present invention.

DETAILED DESCRIPTION OF THE INVENTION

Hereinafter, preferred embodiments of the present invention will be described with reference to the accompanying drawings.

Figure 1:
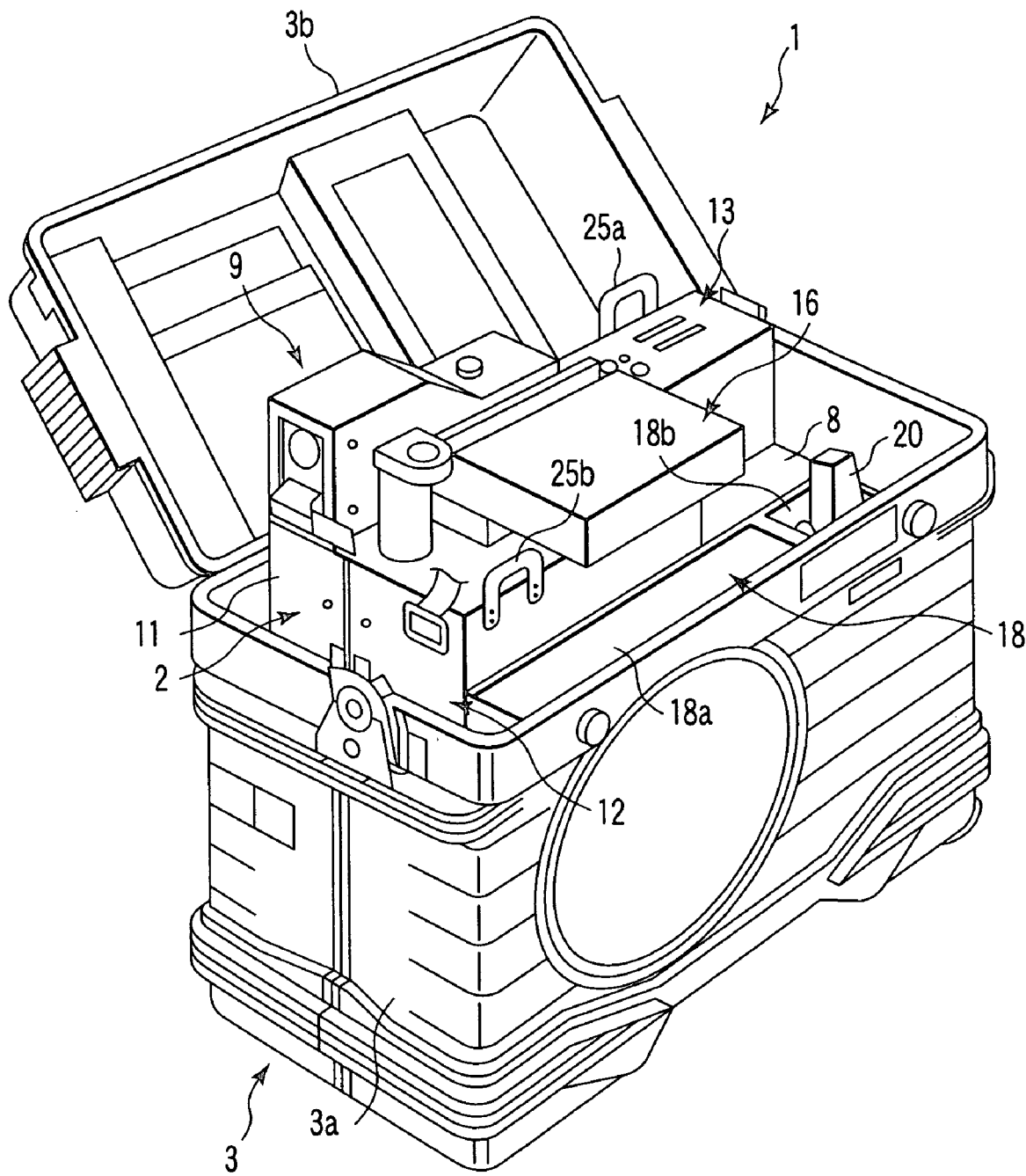
FIG. 1 is a perspective view of the whole endoscope apparatus for industrial use, showing a state in which a lid of an endoscope housing case is opened in the endoscope apparatus for industrial use according to a first embodiment of the present invention.

A first embodiment of the present invention will be described with reference to FIGS. 1 to 5. FIG. 1 shows an external configuration of an endoscope apparatus 1 for industrial use according to the present embodiment. In this endoscope apparatus 1, there are provided: an endoscope main body 2 having an insert portion 4a assembled integrally therewith; and an endoscope housing case 3 for removably housing the endoscope main body 2.

As shown in FIG. 2A, the endoscope housing case 3 is composed of: a box-shaped case main body 3a whose top face is opened; and a lid 3b provided at a top face opening of the case main body 3a. This lid 3b is turnably linked with one side of the top face opening of the case main body 3a via a hinge portion (not shown). FIG. 1 shows a state in which the endoscope main body 2 is housed in the endoscope housing case 3 while the lid 3b is opened.

FIG. 2B is an exploded perspective view showing the endoscope main body 2 of the endoscope apparatus 1. In this endoscope main body 2, a scope unit 4 and an apparatus main body 9 are provided detachably from each other. Then, a housing portion 18 which is an insert portion holding member is provided detachably at this endoscope main body 2. FIG. 2C is a perspective view showing a pin insert hole 18c for mounting the housing portion 18 on the apparatus main body 9. At the housing portion 18, pin insert holes 18c for mounting the housing portion on the apparatus main body 9 are provided. Naturally, the number of holes 18c is not limited to two.

The scope unit 4 has: an elongated insert portion 5 having flexibility, the insert portion 5 being inserted into at least a space targeted for inspection; an intermediate linking portion 6; and a universal cable 7. Here, a distal end configuring portion 5a is arranged at the most distal end position of the insert portion 5. At this distal end configuring portion 5a, there are provided: an illumination optical system for illumination use (not shown); an observation optical system for guiding an observation optical image to an eye contact lens or an image acquiring portion (CCD) (not shown); and a distal opening end of an internal channel (manipulating device inserting channel) which is not shown, the internal channel being arranged at the inside of the insert portion 5, respectively. Further, a flexibly bending portion 5b which is remotely operable to be flexibly bent is provided at the rear end of the distal end configuring portion 5a. At the inside of the insert portion 5, there are provided: a light guide (not shown) for transmitting illumination light to the illumination optical system; an electrical cable connected to the image acquiring portion; and a flexibly bending wire for operating the flexibly bending portion 5b to be flexibly bent or the like.

In addition, a distal end part of the intermediate linking portion 6 is linked with a proximal end part of the insert portion 5. At this intermediate linking portion 6, there is provided a grip portion 6a which can be gripped by one hard of a user. This intermediate linking portion 6 has a grip portion 6a and a channel port portion 6b. At this channel port portion 6b, there is arranged a proximal opening end of an internal channel (not shown) arranged at the inside of the insert portion 5.

Further, a distal end part of the universal cable 7 is linked with a proximal end part of the intermediate linking portion 6. At the inside of this universal cable 7, there are arranged:

a light guide extended from the side of the insert portion 5; an electrical cable for transmission of an image signal to be outputted from the CCD; a flexibly bending wire; and the like.

A proximal end part of the universal cable 7 is linked with a connector portion 8. The connector portion 8 incorporates an electrically driven flexibly bending unit such as an electrically driven flexibly bending control board (not shown), a camera control unit and the like. Then, the flexibly bending wire in the insert portion 5 is linked with the electrically driven flexibly bending unit. This electrically driven flexibly bending unit incorporates a power unit such as a drive motor for driving the flexibly bending wire to be pulled. Then, by means of this electrically driven flexibly bending unit, the flexibly bending wire is driven to be pulled so that the flexibly bending portion 5b is remotely operated to be flexibly bent.

Also, the electrical cable connected to the CCD in the insert portion 5 is connected to the camera control unit. Then, image data on the endoscope observed image acquired by the CCD is converted into an electrical signal so as to be transmitted to the camera control unit via the electrical cable.

Further, as shown in FIG. 2B, a light guide connecting connector portion 8b is protruded at the end face of a unit case 8a of the connector portion 8. A proximal end part of a light guide (not shown) is linked with the light guide connector portion 8b.

At a side plate of the unit case 8a of the connector portion 8, an upper and lower two-stepped protrusive attachment/detachment guide 8c, for guiding movement of the connector portion 8, when linked with the apparatus main body 9, is extended along a substantially horizontal direction. Further, a plurality of fixing brackets 8d are protruded at the end face of this unit case 8a. In addition, a plurality of positioning pins 8e are protruded. When the connector portion 8 and the apparatus main body 9 are linked with each other, these fixing brackets 8d are engaged attachably to/detachably from a receptacle portion (not shown) at the side of the apparatus main body 9, whereby a first connecting mechanism 10 for fixing the connector portion 8 to the apparatus main body 9 is formed.

Figure 3:
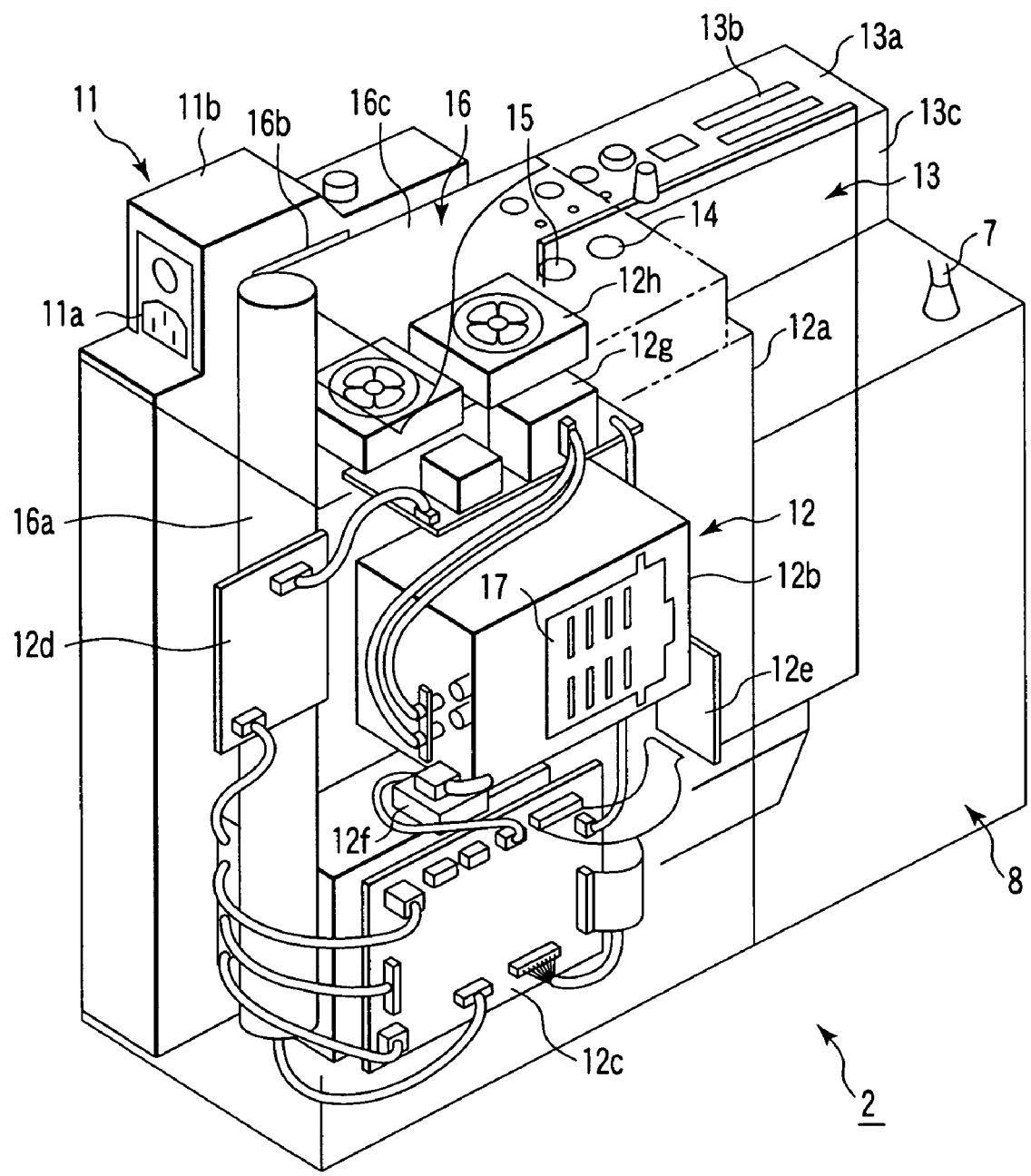
FIG. 3 is a perspective view showing a state in which the endoscope main body of the endoscope apparatus main body is assembled in the endoscope apparatus for industrial use according to the first embodiment.

A power source portion 11, a light source portion 12, and a recording unit portion 13 are provided at the apparatus main body 9. Here, a power source connector 11a and a power source cover 11b are provided at the power source portion 11, as shown in FIG. 3. A power source cable 11c is connected to the power source connector 11a.

At the recording unit portion 13, slots 13b for inserting a plurality of recording mediums, for example, a memory card, are formed on a front panel 13a. Further, at a side plate 13c of the recording unit portion 13, an upper and lower two-stepped recessed guide groove 13d for guiding movement of the connector portion 8 is extended along a substantially horizontal direction. Attachment/detachment guides 8c of the connector portion 8 of the scope unit 4 are removably attached to these guide grooves 13d.

In addition, as shown in FIG. 3, at the inside of a sheath cover 12a of the light source portion 12, there are provided: a lamp box 12b having a light source lamp (not shown); a relay board 12c; a lamp line board 12d; an EL connector board 12e; an IL switch 12f; a ballast 12g; and a fan 12h, respectively.

Further, at the sheath cover 12a of the light source 12, a receptacle portion (not shown) to be removably attached to the light guide connecting connector portion 8b of the connector portion 8 is provided on a face for connection with the connector portion 8 of the scope unit 4.

Then, when the light source portion 12 of the apparatus main body 9 is linked with the connector portion 8 of the scope unit 4, these portions are engaged with each other in a state in which the attachment/detachment guide 8d of the connector portion 8 of the scope unit 4 is inserted into the guide 13d of the recording unit portion 13. In this state, the apparatus main body 9 and connector portion 8 are positioned by means of positioning pins 8e while the attachment/detachment guide 8c is moved to be slid along the guide groove 13d, so that the connector portion 8 of the scope unit 4 is detachably linked with the light source portion 12 of the apparatus main body 9.

At this time, the light guide connecting connector portion 8b of the connector portion 8 is detachably engaged with a receptacle portion (not shown) of the light source portion 12. In addition, the fixing bracket 8d of the first connecting mechanism 10 is detachably engaged with a receptacle portion (not shown) at the side of the apparatus main body 9 so that the light source portion 12 of the apparatus main body 9 are linked with the connector portion 8 of the scope unit 4.

A remote controller connector 14, a BNC connector 15, and a display device 16 are provided on the top face of the sheath cover 12a of the light source portion 12. Here, at the display device 16, an LCD monitor 16c, for example, is mounted via a hinge mechanism 16b at the upper part of a columnar mono-pod 16a. Then, the LCD monitor 16c is openably/closably supported via the hinge mechanism 16b.

Further, at the side face of the sheath cover 12a of the light source portion 12, a lamp replacing portion 17 is arranged as shown in FIG. 2B, and a plurality of mount pins 19 for mounting the housing portion 18 are protruded.

Figure 5:
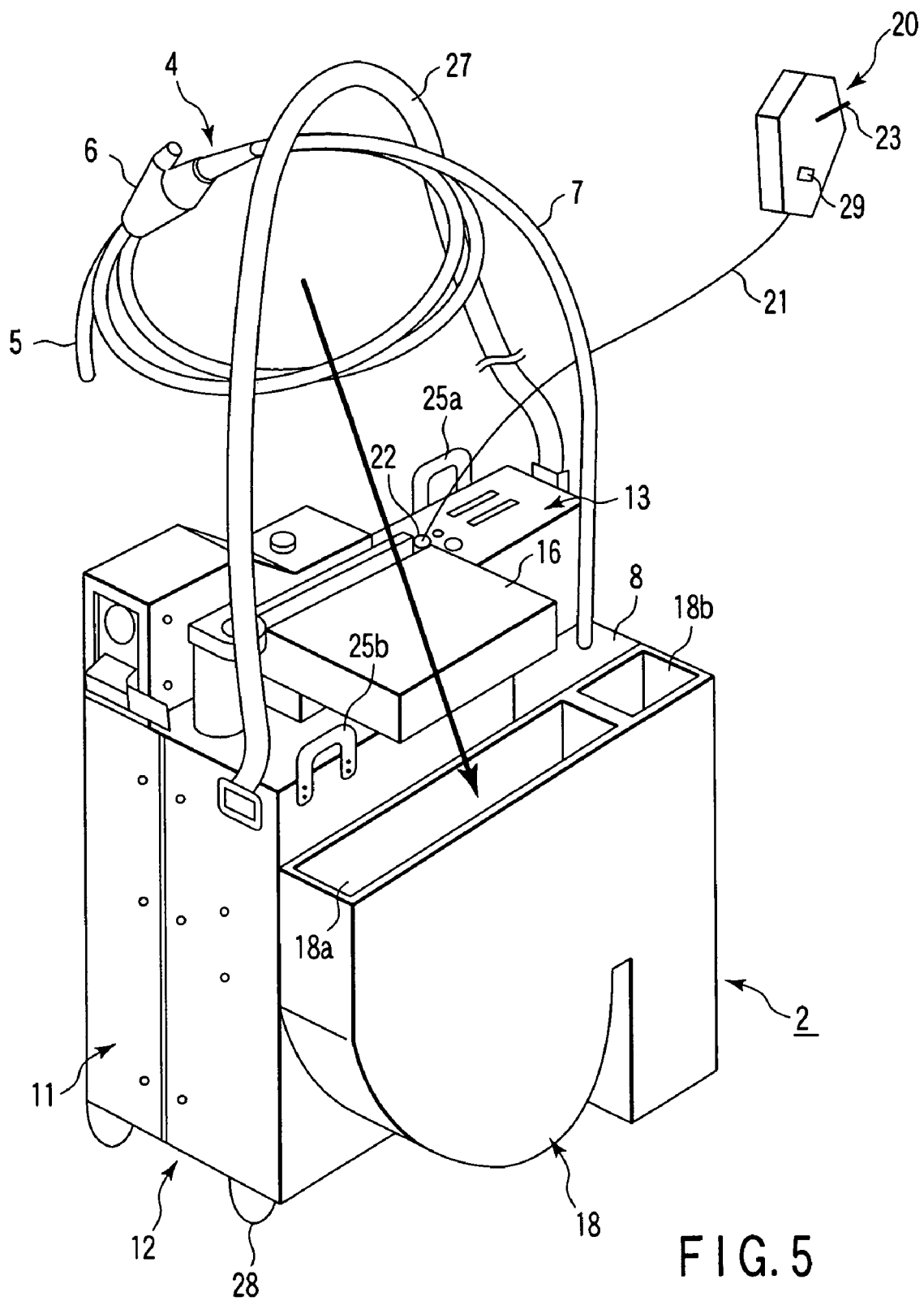
FIG. 5 is a perspective view showing a state in which a shoulder held of the endoscope apparatus main body is attached in the endoscope apparatus for industrial use according to the first embodiment.

In addition, the housing portion 18 is formed of a resin or a metal, and is formed in a box shape whose top face is opened. In a housing space of the inside of the housing portion 18, a housing chamber is partitioned into a plurality of sections, for example, two sections. Then, a wide scope housing portion 18a and a remote control housing portion 18b in which remote controller is housed, which is a narrow operating portion, are formed. Here, the scope housing portion 18a, as shown in FIG. 5, is capable of housing the insert portion 5 of the scope unit 4, the intermediate linking portion 6, and the universal cable 7 to be bundled in a substantial spiral.

Figure 4:
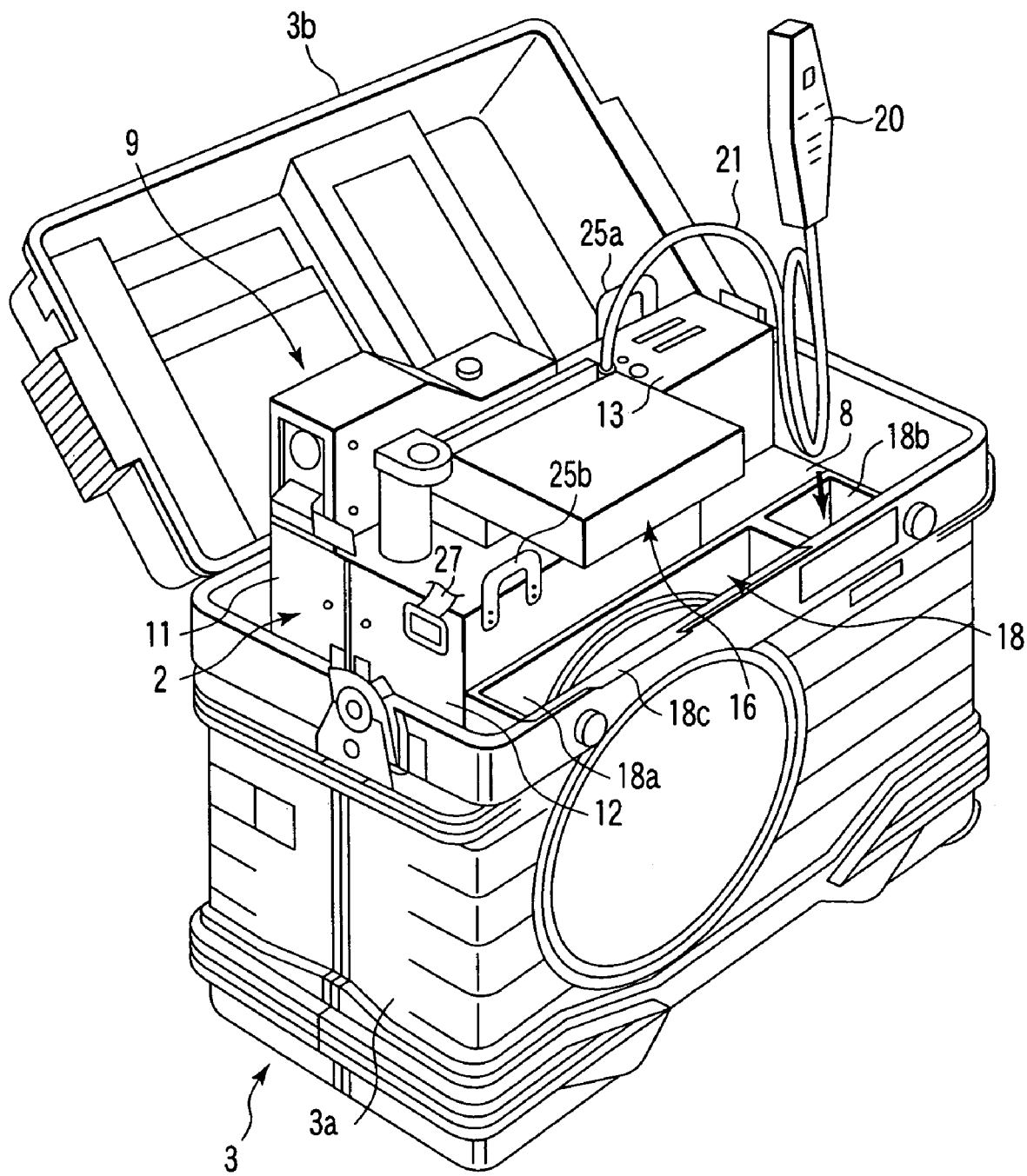
FIG. 4 is a perspective view of the whole endoscope apparatus for industrial use showing a state in which a lid of an insert portion housing portion is opened in the endoscope apparatus for industrial use according to the first embodiment.

As shown in FIG. 4, the remote control housing portion 18b houses: a remote controller (operating portion) 20 for operating the endoscope main body 2; and a flexible cable 21 connected to this remote controller 20 at one end thereof. A connector 22 is connected to the other end of the cable 21, as shown in FIG. 5.

This connector 22 is detachably connected to the remote controller connector 14 of the apparatus main body 9. A joystick 23 for remotely operating the flexibly bending portion 5b of the scope unit 4 to be flexibly bent, a power source button 29 and the like are provided at the remote controller 20. The joystick 23 is provided as an operating lever at which a proximal end part thereof is turnably supported via a turning fulcrum. Then, a signal corresponding to a tilt angle of this joystick 23 is generated.

Further, on a mount face for the apparatus main body 9 in the housing portion 18, the pin insert holes 18c as shown in FIG. 2C are formed at the positions corresponding to the mount pins 19 of the light source portion 12. The mount pin 19 of the sheath cover 8a is inserted into the pin insert hole 18c of the housing portion 18, whereby the housing portion 18 is detachably linked with the side face of the sheath cover 8*a* of the light source portion 12.

A substantially L-shaped scope housing portion pressing member 24 is fixed to be screwed at the side of the apparatus main body 9 in a state in which the housing portion 18 is linked with the side face of the sheath cover 8*a* of the light source portion 12. A second connecting mechanism 26 for fixing the housing portion 18 to the side face of the sheath cover 8*a* of the light source portion 12 is formed by the scope housing pressing member 24.

Moreover, in the endoscope apparatus 1 according to the present embodiment, there are fixed: two grips 25*a*, 25*b* used for attaching/detaching the endoscope main body 2 to/from the endoscope housing case 3; and a shoulder belt 27. Here, one grip 25*a* is mounted at the upper part of the recording unit portion 13 in the apparatus main body 9; and the other grip 25*b* is mounted at the upper part of the sheath cover 8*a* of the light source portion 12, respectively. Similarly, one end of the shoulder belt 27 is fixed to the upper part of the recording unit portion 13 in the apparatus main body 9; and the other end is fixed to the upper part of the sheath cover 8*a* of the light source portion 12, respectively. A plurality of rubber legs 28 are fixed to the bottom part of the endoscope main body 2.

Next, an operation of the thus configured endoscope apparatus will be described.

In the endoscope apparatus 1 for industrial use according to the present embodiment, there is formed the endoscope main body 2 in which the scope unit 4, the apparatus main body 9, and the housing portion 18 which are shown in FIG. 2B are assembled integrally with each other. Then, the endoscope main body 2 is formed in this state in the endoscope housing case 3 in FIG. 2A. Further, as shown in FIG. 1, the endoscope housing case 3 is transported close to a place targeted for inspection with the lid 3*b* of the case closed.

Then, as shown in FIG. 4, the lid 3*b* of the endoscope housing case 3 is opened, and the insert portion 5 of the scope unit 4, the intermediate linking portion 6, and the universal cable 7 are removed from the scope housing portion 18*a*. In addition, the remote controller 20 and the cable 21 are removed from the remote controller housing portion 18*b*. In this state, the insert portion 5 of the scope unit 4 is inserted into a space targeted for inspection, and endoscope inspection in the space targeted for inspection is carried out.

In addition, in the case where the endoscope main body 2 in the endoscope housing case 3 does not always need to be rigidly protected with the endoscope housing case 3 at the time of transport of the endoscope apparatus 1, the endoscope main body 2 may be transported to a required place in a state shown in FIG. 5 in which the endoscope main body 2 is detached from the endoscope housing case 3. The apparatus main body 9 of the endoscope main body 2, the connector portion 8, and the housing portion 18 are designed so as to have sufficient strengths, respectively.

Further, at the time of transport of the endoscope main body 2, the main body may be carried by a shoulder strap 27 hung on the shoulder, or alternatively, the endoscope main body 2 may be carried by placing it on a trolley. At this time, the insert portion 5 of the scope unit 4, the intermediate linking portion 6, and the universal cable 7 are housed in the scope housing box 6*a*; and the remote controller 20 and the cable 21 are housed in the remote controller housing portion 18*b*, respectively.

When endoscope inspection in a space targeted for inspection is carried out, an AC cable (not shown) is plugged in a receptacle, and the remote controller 20 and the cable 21 are taken out from the remote controller housing portion 18*b*. Then, the insert portion 5 of the scope unit 4, the intermediate linking portion 6, and the universal cable 7 are taken out from the scope housing box 6*a*, and the power source button 29 of the remote controller 20 is turned ON.

After the endoscope inspection of the inside of the space targeted for inspection, the remote controller 20 is housed in the remote controller housing portion 18*b* in a state in which the power source button 29 is turned OFF. Further, the insert portion 5 of the scope unit 4, the intermediate linking portion 6, and the universal cable 7, which are used in endoscope inspection, are housed in the scope housing box 6*a* while they are bundled in a substantial spiral, as shown in FIG. 5. In this manner, the housing of components of the endoscope apparatus 1 for industrial use has now been completed.

Thereafter, in the case where the endoscope apparatus 1 for industrial is transported by airplane or truck for use in a remote site, the endoscope main body 2 may be housed in the endoscope housing case 3. In another case, the endoscope main body 2 may be used while it is removed from the endoscope housing case 3. The following advantageous effects are achieved in the above described configuration.

That is, in the endoscope apparatus 1 for industrial use according to the present embodiment, the scope unit 4, the apparatus main body 9, and the housing portion 18 form the endoscope main body 2 which is integrally assembled, as shown in FIG. 3 so that the endoscope main body 2 can be carried while it is removed from the endoscope housing case 3. The endoscope housing case 3 is thick, so as to protect the endoscope main body 2, and is heavy in weight. Because of this, when unnecessary, the housing portion 18 is removed from the endoscope housing case 3 together with the endoscope main body 2, whereby this endoscope main body 2 is light in weight, and can be used for endoscope inspection in a space targeted for inspection. As a result, the endoscope apparatus 1 for industrial use is reduced in weight, and the transport of the endoscope apparatus 1 can be easily carried out. In addition, by removing the endoscope main body, the endoscope apparatus can be reduced in size. Thus, the endoscope apparatus can be transported within a small space, and an inspection space can be allocated.

The remote controller 20 is housed in the remote controller housing portion 18*b* of the housing portion 18 removed from the endoscope housing case 3 together with the endoscope main body 2. Then, the insert portion 5 of the scope unit 4, the intermediate linking portion 6, and the universal cable 7, which are used in endoscope inspection, are bundled in a spiral, as shown in FIG. 5, so as to be housed in the scope housing box 6*a*.

Even if the endoscope housing case 3 is not present, the housing portion 18 can house the insert portion 5 of the scope unit 4, the intermediate linking portion 6, the universal cable 7, and the remote controller 20. Thus, there is no danger of damaging the insert portion 5 removed from the endoscope housing case 3 or the remote controller 20.

Figure 6:
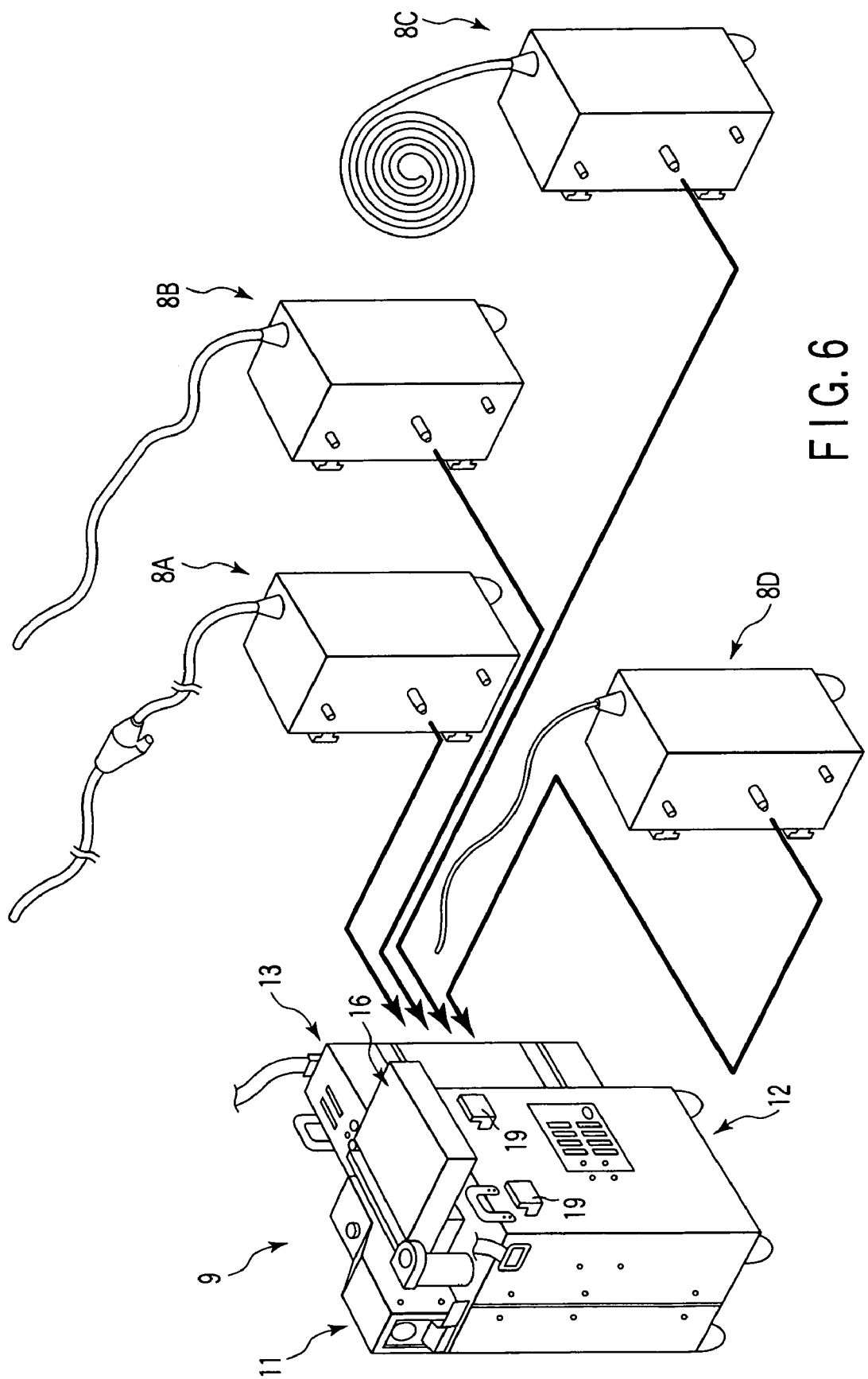
FIG. 6 is a view for illustrating a first modified example of the endoscope apparatus for industrial use according to the first embodiment.

FIG. 6 shows a modified example of the endoscope apparatus 1 for industrial use according to the first embodiment (refer to FIGS. 1 to 5). In this modified example, four types of plural scope units 4*a*, 4*b*, 4*c*, and 4*d* which are different from each other are provided in advance at the endoscope main body 2 of the endoscope apparatus 1 for industrial use according to the first embodiment, and any one of these scope units 4*a*, 4*b*, 4*c*, and 4*d* can be selectively linked with a common apparatus main body 9. Similarly, an insert portion unit having the insert portion 5 of the scope unit 4, the intermediate linking portion 6, and the universal cable 7 linked with each other is provided in plurality, whereby any one of these plural insert portion units can be selectively linked with a common connector portion 8.

Figure 7A:
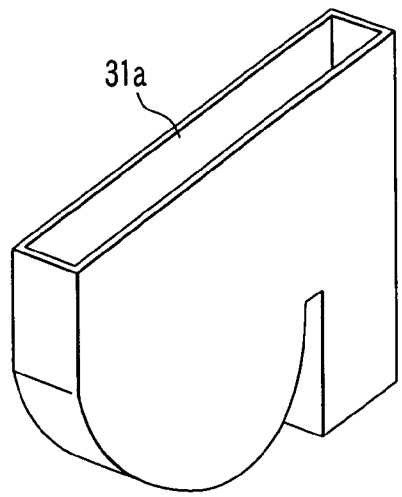
FIG. 7A is a perspective view showing a first modified example of the insert portion housing portion of the endoscope apparatus for industrial use according to the first embodiment.

FIG. 7A is a perspective view showing a first modified example of the housing portion 18 linked with the apparatus main body 9 of the endoscope apparatus 1 for industrial use according to the first embodiment. In a housing portion 31 according to the present modified example, there is no partition between the scope housing box 18a and the remote controller housing portion 18b of the housing portion 18 in the first embodiment, and a large housing space 31a is formed therein. In the housing space 31a of this housing portion 31, the insert portion 5 of the scope unit 4, the intermediate linking portion 6, and the universal cable 7 can be housed in a state in which they are bundled in a substantial spiral. In addition, the remote controller 20 and the flexible cable 21 connected to this remote controller 20 at one end can be housed, respectively.

Figure 7B:
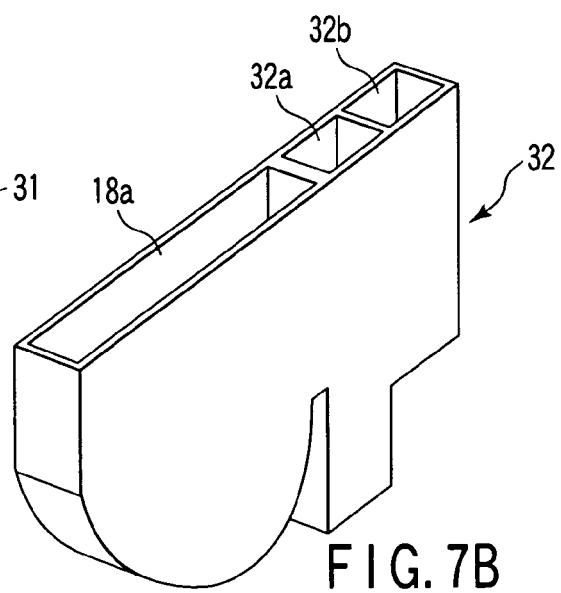
FIG. 7B is a perspective view showing a second modified example of the same.

FIG. 7B is a perspective view showing a second modified example of the housing portion 18 linked with the apparatus main body 9. In a housing portion 32 according to this modified example, a portion corresponding to the remote controller housing portion 18b of the housing portion 18 according to the first embodiment is partitioned by two small article housing chambers 32a, 32b. In a scope housing box 18a which is similar to that according to the first embodiment, the scope unit 4 (the insert portion 5, intermediate linking portion 6, and universal cable 7) can be housed in a state in which it is bundled in a substantial spiral. Further, for example, the remote controller 20 can be housed in one small article housing chamber 32a, and, the cable 21 can be housed in the other small article housing chamber 32b, respectively.

Figure 7C:
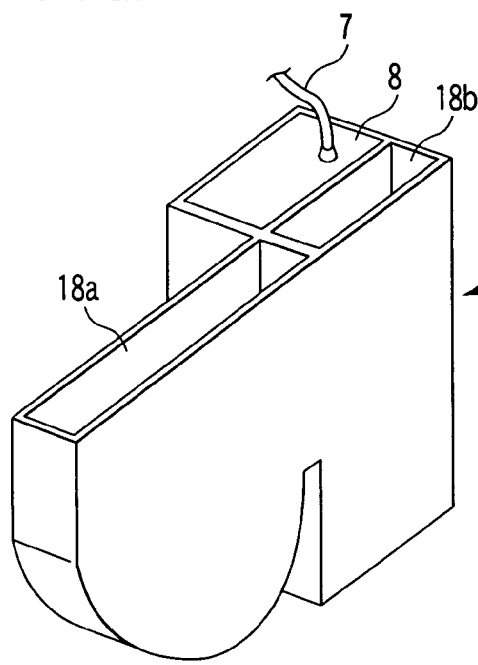
FIG. 7C is a perspective view showing a third modified example of the same.

FIG. 7C is a perspective view showing a third modified example of the housing portion 18 linked with the apparatus main body 9. In a housing portion 33 according to the present modified example, the connector portion 8 and the housing portion 18 of the scope unit 4 according to the first modified example are integrated with each other. Therefore, in the third modified example, the number of components in the entire apparatus can be reduced.

Figure 7D:
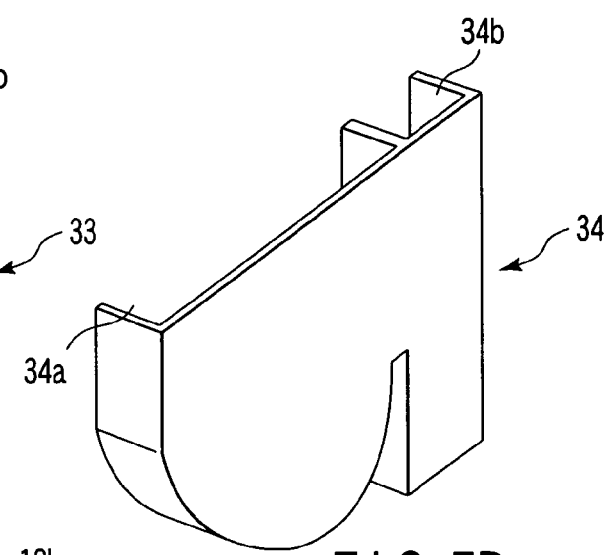
FIG. 7D is a perspective view showing a fourth modified example of the same.

FIG. 7D is a perspective view showing a fourth modified example of the housing portion 18 linked with the apparatus main body 9. In the present modified example, as in the first embodiment, a housing portion cover 34 which is opened on one side face is provided instead of the box-shaped housing portion 18. An opening face of the housing portion cover 34 according to the present modified example is linked with a side face of the sheath cover 8a of the light source portion 12 in the apparatus main body 9, whereby spaces 34a, 34b which are similar to the scope housing box 18a and remote controller housing portion 18b of the housing portion 18 according to the first embodiment are formed between the side face of the sheath cover 8a of this light source portion 12 and the housing portion cover 34. With this configuration, the endoscope apparatus can be further reduced.

Figure 7E:
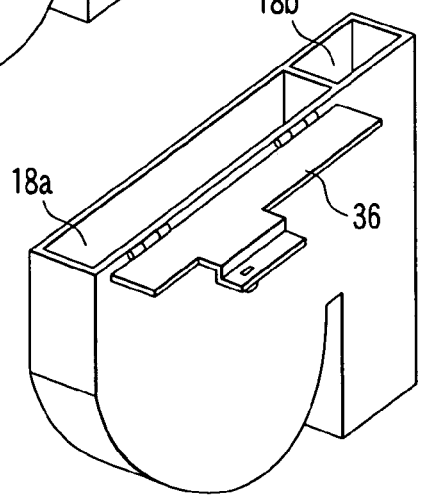
FIG. 7E is a perspective view showing a fifth modified example of the same.

FIG. 7E is a perspective view showing a fifth modified example of the housing portion 18 linked with the apparatus main body 9. A housing box lid 36 for closing the remote controller housing portion 18b is provided at a housing portion 35 of the present modified example. Thus, in the present modified example, the insert portion is prevented from running out of the upper part of the housing portion due to a drop shock at the time of transport of the entire endoscope apparatus, and the damage due to such run-out can be prevented.

FIG. 8A is a perspective view showing a sixth modified example of the housing portion 18 linked with the apparatus main body 9. In the sixth modified example, a box-shaped housing box 38 is provided instead of the housing portion 18 according to the first embodiment. In this housing box 38, a lid 39 opening and closing a top face opening is provided. In this housing box 38, the scope unit 4 (the insert portion 5, intermediate linking portion 6, and universal cable 7) can be housed in a state in which it is bundled in a substantial spiral, and the remote controller 20 operating the connector portion 8 of the scope unit 4 and the cable 21 can be housed, respectively.

FIG. 8B is a perspective view showing a seventh modified example of the housing portion 18 linked with the apparatus main body 9. In the seventh modified example, a housing bag 40 is provided instead of the housing portion 18 according to the first embodiment. A string 41 opening and closing an opening is provided at a marginal site of the opening of this housing bag 40. Then, in this housing bag 40, the scope unit 4 (the insert portion 5, intermediate linking portion 6, and universal cable 7) is housed in a state in which it is bundled collectively.

The scope unit 4 may be housed in a housing box 38 of FIG. 8A together with this housing bag 40 by putting the scope unit in the housing bag 40.

Figure 9A:
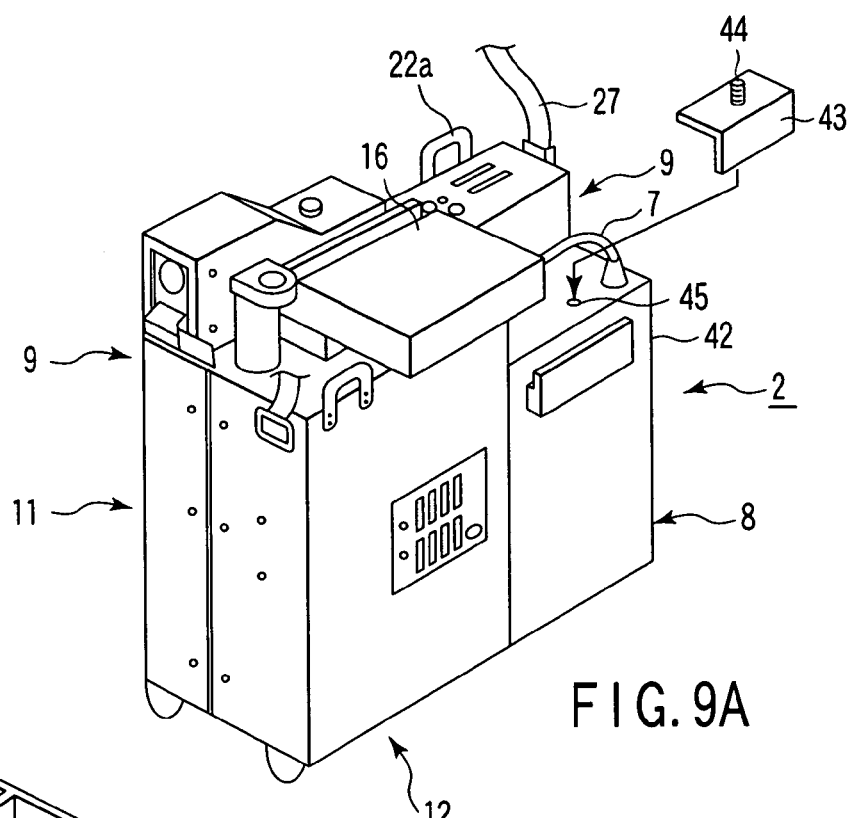
FIG. 9A is a perspective view showing a second modified example of the endoscope apparatus for industrial use according to the first embodiment.
Figure 9B:
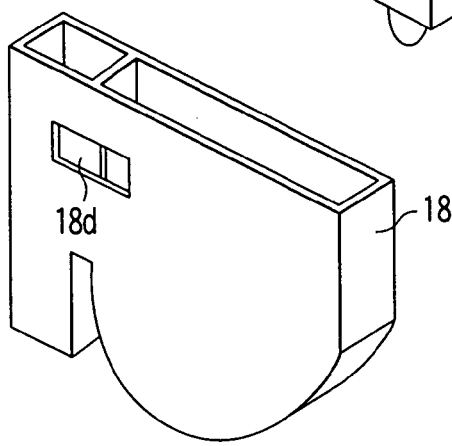
FIG. 9B is a perspective view showing a hole for mounding a housing portion of FIG. 9A on a connector portion.
Figure 9C:
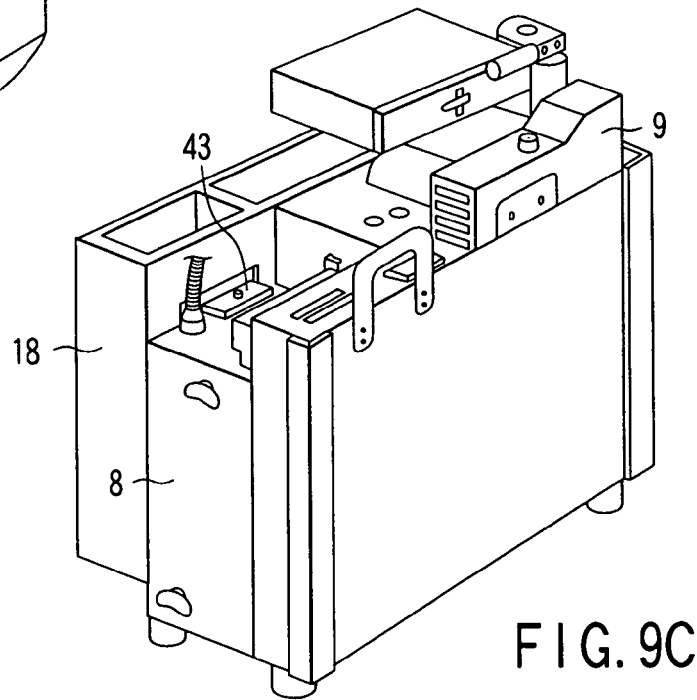
FIG. 9C is a rear perspective view showing a state in which the housing portion is mounted on the connector portion.

FIGS. 9A to 9C show a second modified example of the endoscope apparatus 1 for industrial use according to the first embodiment (refer to FIGS. 1 to 5).

In this second modified example, a mounting member 42 is provided on a side face of the unit case 8a of the connector portion 8. A mount hole 18d is provided in the housing portion 18, and further, an L-shaped scope housing box pressing member 43 (corresponding to the scope housing box pressing member 24) is fixed by screws 44 at a screw hole 45 provided on a top face of the connector portion 8.

Therefore, in this second modified example, even when the connector portion 8 is removed from the apparatus main body 9 and is stored, the scope unit 4 can be housed, and there is no danger that the scope unit will be damaged.

Figure 10A:
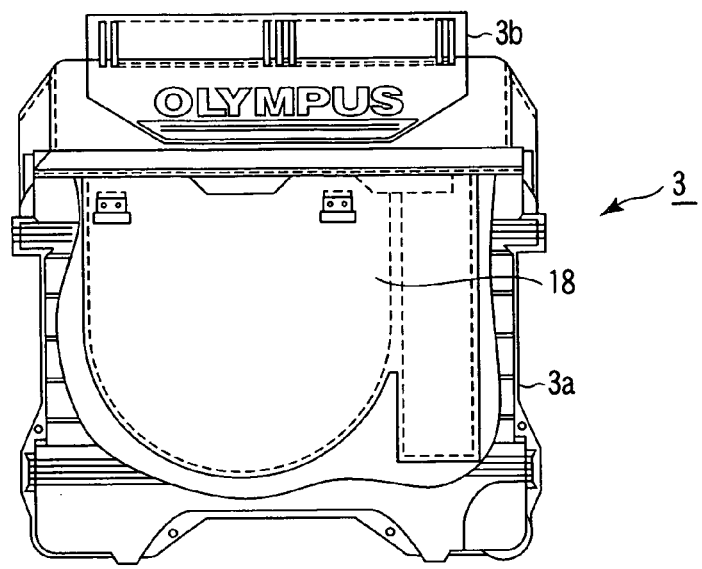
FIG. 10A is a perspective view showing a third modified example of the endoscope apparatus for industrial use according to the first embodiment.
Figure 10B:
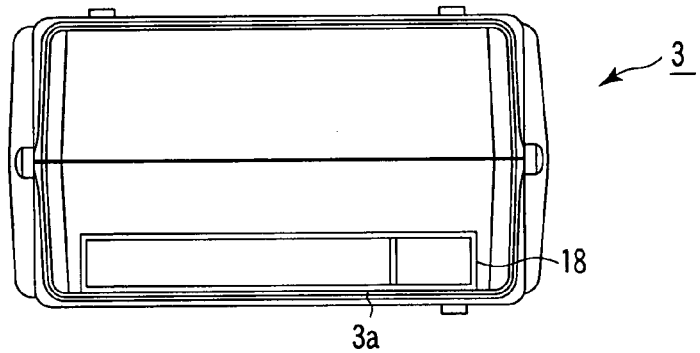
FIG. 10B is a top view of the endoscope apparatus for industrial use of FIG. 10A.
Figure 10C:
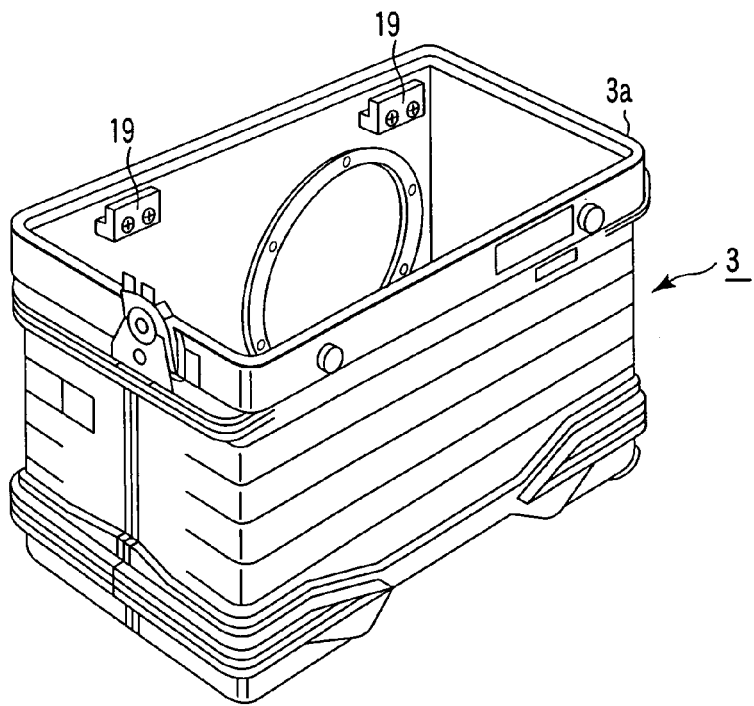
FIG. 10C is a detailed perspective view when a mount pin of FIG. 10A is installed in the endoscope housing case.

FIG. 10 shows a third modified example of the endoscope apparatus 1 for industrial use according to the first embodiment (refer to FIGS. 1 to 5).

In the ninth modified example, a mount pin 19 is provided at the inside of the endoscope case 3. Thus, in the present modified example, the housing portion 18 is used by removing only the endoscope main body 2 from the endoscope case 3 at the time of movement or inspection which does not require the housing portion 18, whereby further downsizing and reduction in weight can be achieved.

Figure 11:
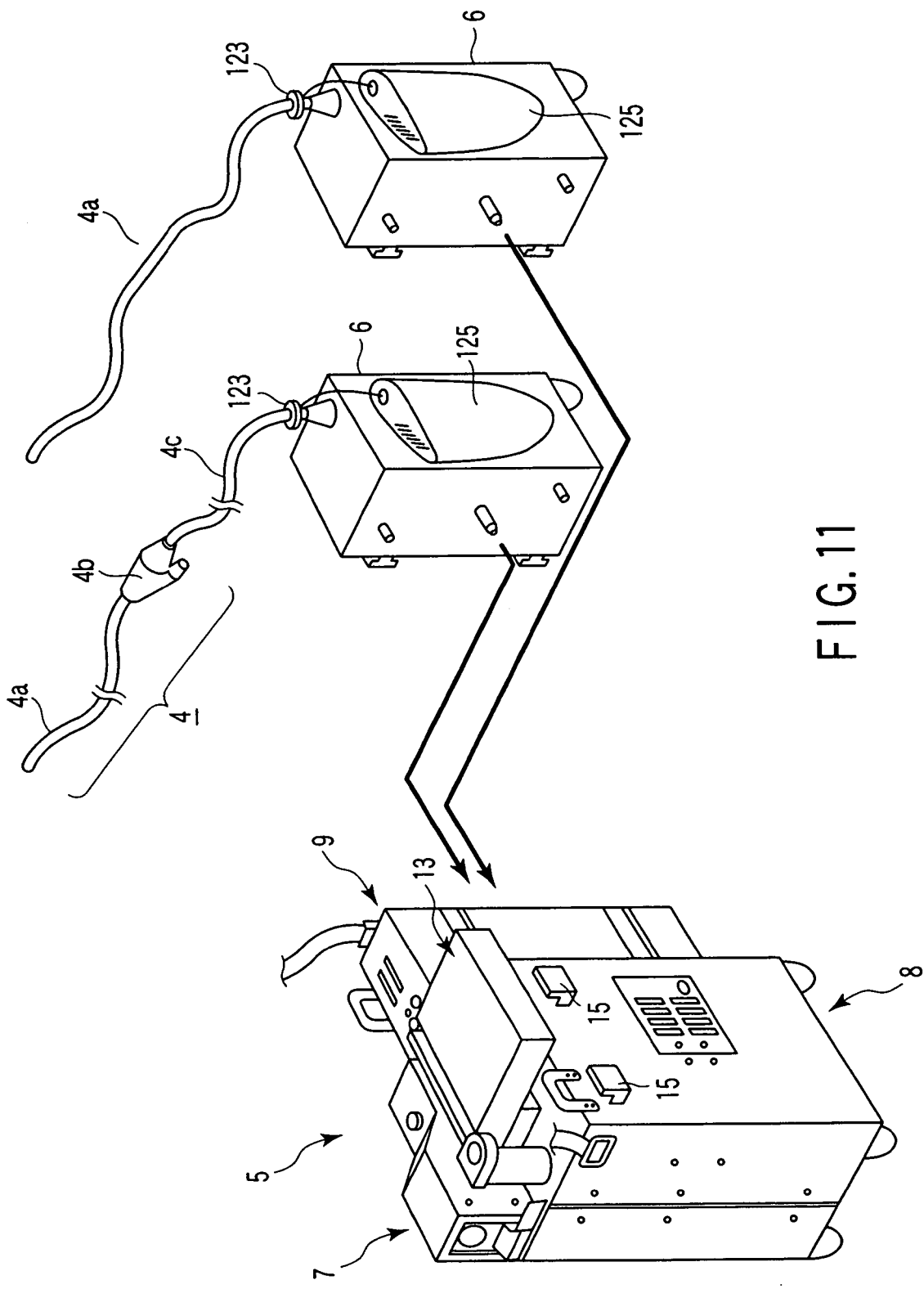
FIG. 11 is a view showing a fourth modified example of the endoscope apparatus for industrial use according to the first embodiment.

FIG. 11 shows a fourth modified example of the endoscope apparatus 1 for industrial use according to the first embodiment (refer to FIGS. 1 to 5).

In the present modified example, an attaching portion 123 is mounted on the insert portion 4a or the universal cable 4c of the scope unit 4. On this attaching portion 123, a housing portion 6 composed of an insert portion holding member 125 linked with a chain 124 or the like is mounted.

Figure 12:
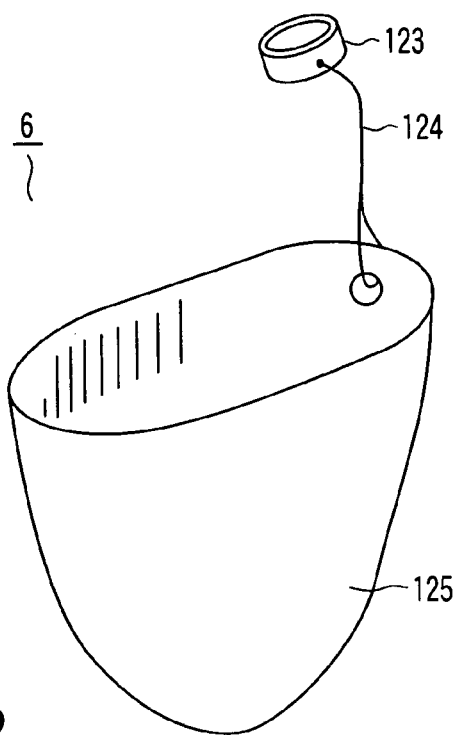
FIG. 12 is a view showing a detailed configuration of a housing portion shown in FIG. 11.

FIG. 12 is a view showing a detailed configuration of this housing portion 6.

This housing portion 6 is formed in a bag shape, and a ring-shaped attaching portion 123 externally engaged with the universal cable 4c is provided. These attaching portion 123 and insert portion holding member 125 are linked with the chain portion 124 whose end is adhesively bonded or soldered at the attaching portion 123 through a hole portion provided at a portion of this insert portion holding member 125. The stripe portion 124 may be a string.

Figure 13A:
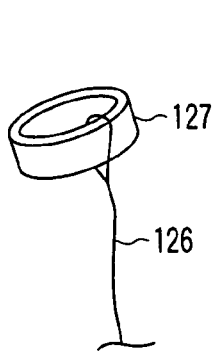
FIGS. 13A, 13B, and 13C are views each showing a modified example of an attaching portion and a chain portion in the fourth modified example.
Figure 13B:
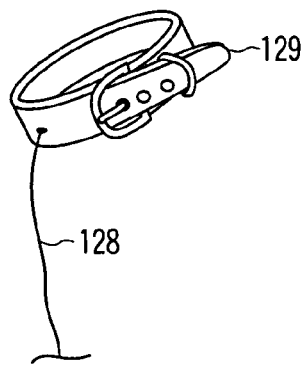
Figure 13C:
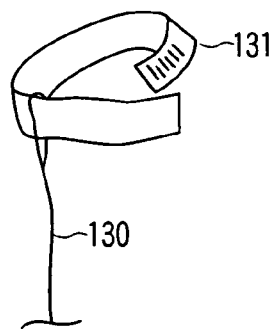

FIGS. 13A, 13B, and 13C are views each showing a modified example of an attaching portion and a chain portion. FIG. 13A shows that a chain portion 126 is formed in a spiral, and is linked with an attaching portion 127. FIG. 13B shows an example when a belt 129 is used for the attaching portion. This example is preferred in a configuration in which the intermediate linking portion 4b is provided in the middle of the scope unit 4. FIG. 13C shows an example of a belt using a napped tape (such as Velcro tape, for example). A ring-shaped chain portion 124 is routed into this belt 131.

Figure 14:
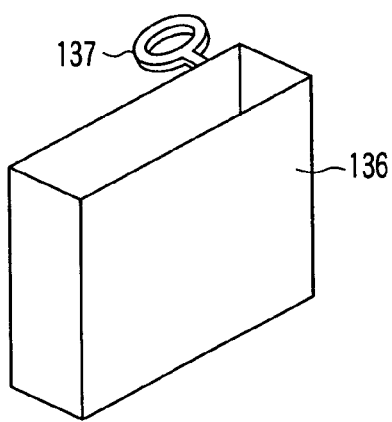
FIG. 14 is a view showing a modified example of a housing portion in the fourth modified example.

In FIG. 14, the housing portion 6 is not formed in a bag shape, and is composed of a box body 136 made of a hard member. A hard attaching portion 137 is provided in this box body 136. This attaching portion may be a belt or a napped tape. In the present modified example, there is no need to provide a protrusion or member for connecting a housing portion at the apparatus main body 5, connector portion 4c or the like, and the housing portion 6 can be easily mounted.

FIG. 15 shows a fifth modified example of the endoscope apparatus 1 for industrial use according to the first embodiment (refer to FIGS. 1 to 5).

The endoscope apparatus for industrial use shown in FIG. 15 is composed of an apparatus main body 2 and an endoscope housing case 3 which detachably houses this apparatus main body 2. At this apparatus main body 2, there are provided: a connector portion 142; a light source portion (not shown); a camera control unit (CCU); a recording unit portion and the like. In addition, a power source cable 153 at which a plug 152 is provided is connected to the apparatus main body 2.

Further, a scope unit 4 has an elongated insert portion 4a having flexibility, the insert portion being inserted into at least a space targeted for inspection; an intermediate linking portion (operating portion) 4b; and a universal cable 4C. Here, the insert portion 4a is composed of: a distal end configuring portion (head portion) 4a1 disposed at the most distal end position, the configuring portion having incorporated therein an observation optical system for observation, an illumination optical system and the like; a flexibly bending portion 4a2 which can be flexibly bent remotely; and an elongated flexible tube portion 4a3.

A distal end part of the operating portion 4b is linked with a proximal end part of the flexible tube portion 4a3 of the insert portion 4a. At this operating portion 4b, there are mainly provided a joystick (flexibly bending operation means) 145 and a power source button 146, the joystick being flexibly bending input means of electrically driven flexibly bending operation type, for remotely operating the flexibly bending direction of the flexibly bending portion 4a2 of the scope unit 4 in the vertical and horizontal directions.

At the joystick 145, there is provided an operating lever 145a turnably supported with a proximal end portion being a turning fulcrum. Then, a signal corresponding to a tilt angle of this operating lever 145a is generated.

Further, a monitor portion (display means) 147 and an internal channel forceps opening (proximal opening end) 148 (not shown) are provided upwardly of a grip portion 151 of the operating portion 4b. Here, display panel 147a such as a liquid crystal display (LCD), for example, and a casing 147b in which the display panel 147a is housed, are provided at the monitor portion 147.

Moreover, a tubular forceps opening configuring member 150 forming an internal channel forceps opening 148 at the lower end part of the monitor portion 147 and at the proximal position of the joystick 145 is fixed in the casing of the grip portion 151. Then, an internal channel proximal opening is fixed to be linked with the internal end part of this forceps opening configuring member 150.

A linking portion with the distal end part of the universal cable 4c is provided at the lower end part of the grip portion 151. At the inside of this universal cable 4c, there are extended: a light guide extended from the side of the insert portion 4a; a signal line for transmission of an image signal outputted from a CCD; a signal line connected to the display panel 147a of the monitor portion 147; and the like.

In addition, a connector portion 142 is provided at the proximal end part of the universal cable 4c. A light guide connecting end, a signal line connecting terminal and the like are provided at the connector portion 142. Then, the connector portion 142 is configured so as to be detachably linked with the apparatus main body 2.

The apparatus main body 2 incorporates a power source portion, a light source portion, a camera control unit and the like. When the connector portion 142 is linked with the apparatus main body 2, the light guide connecting end of the connector portion 142 is connected to the light source portion so that the illumination light emitted from the light source portion is incident to the light guide connecting end. Further, a connecting terminal or the like such as a signal line of the connector portion 142 is connected to the camera control unit.

A drive motor of a flexibly bending driving mechanism at the flexibly bending portion 4a2 of the insert portion 4a according to the present embodiment may be provided in the grip portion 151 of the operating portion 4b or in the connector portion 142, or may be provided in the apparatus main body 2. In the case where the drive motor of the flexibly bending driving mechanism is disposed in the connector portion 142 or in the apparatus main body 2, a member for transmitting the driving force of the drive motor of this flexibly bending driving mechanism, for example, an angle wire is routed into the universal cable 4c.

In the endoscope housing case 3, there are provided: a box-shaped case main body 3a whose top face is opened; and a lid 3b opening and closing the top face opening of the case main body 3a. By means of a hinge portion (not shown), this lid 3b is turnably linked with one side of the top face opening of the case main body 3a. Further, a housing portion which is an insert portion holding member detachably provided together with the apparatus main body 2, is provided at the inside of the case main body 3a. In this housing portion, the insert portion 4a, operating portion 4b, and universal cable 4c are housed in a state in which they are bundled in a substantial spiral, for example.

Figure 16:
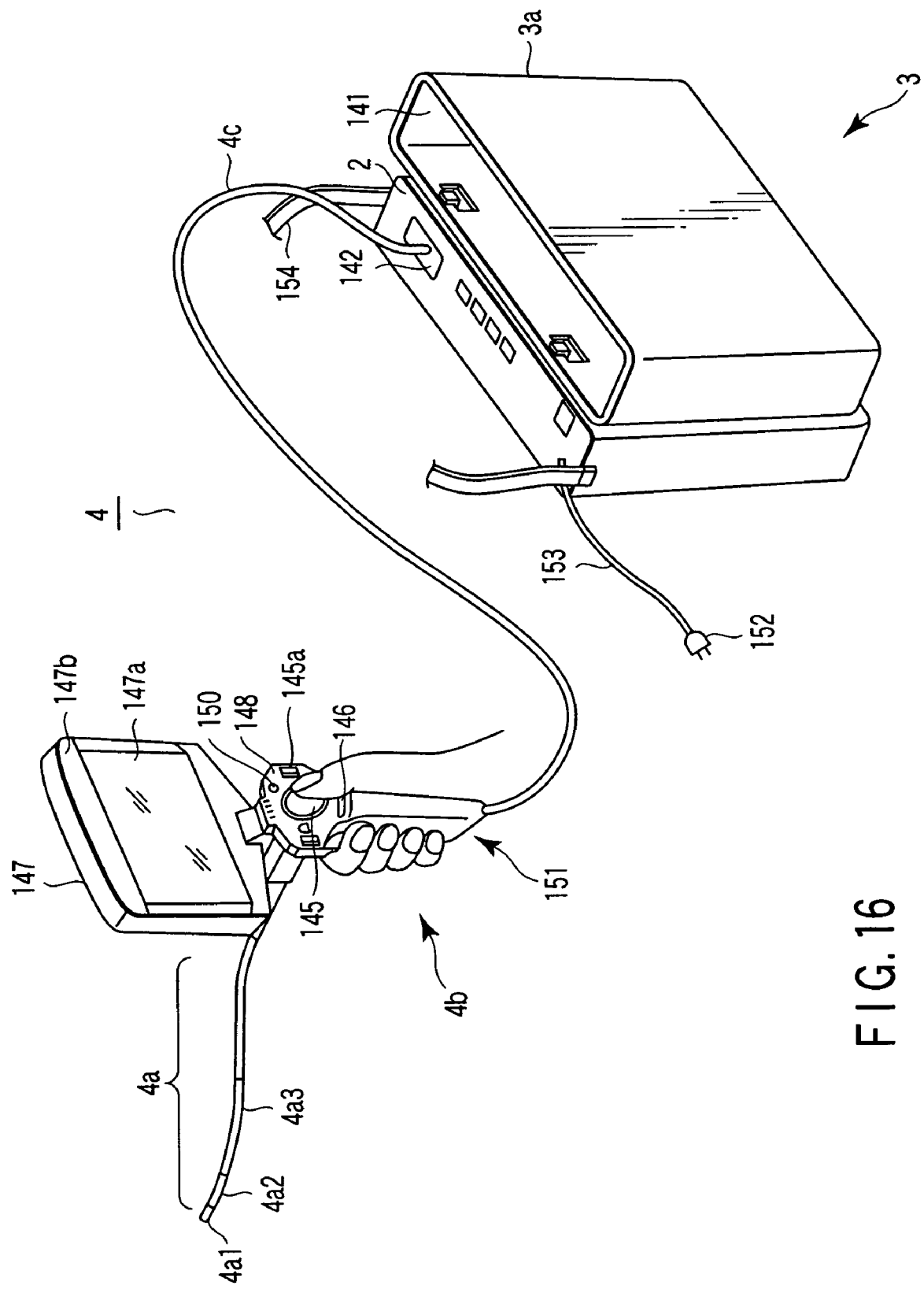
FIG. 16 is a view showing a state in which an apparatus main body and a housing portion in FIG. 15 are removed from an endoscope housing case.

FIG. 16 is a view showing a state in which the aforementioned apparatus main body 2 and housing portion 141 of FIG. 15 are removed from the endoscope housing case 3. In this way, the apparatus main body 2 and housing portion 141 can be removed from the endoscope housing case 3.

Figure 17:
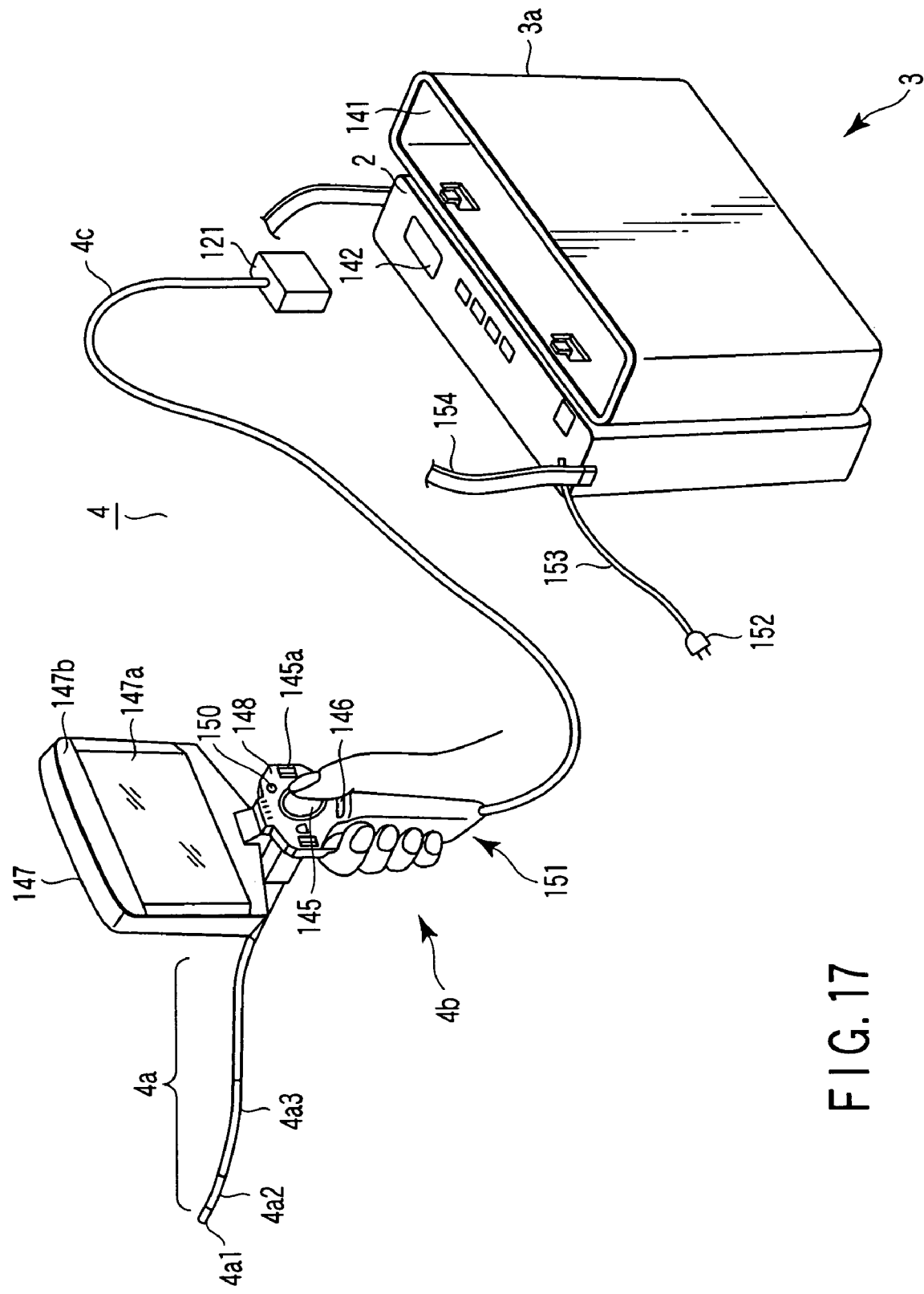
FIG. 17 is a view showing a state in which a connector portion is removed from the apparatus main body shown in FIG. 16.

FIG. 17 is a view showing a state in which a connector portion 121 is removed from the apparatus main body 2 shown in FIG. 16. In this way, a connector portion 151 can be removed from the apparatus main body 2.

FIG. 18 shows a second embodiment of the present invention. In the present embodiment, a configuration of the endoscope apparatus 1 for industrial use according to the first embodiment (refer to FIGS. 1 to 5) is changed as follows.

In the present embodiment, a basic configuration of the endoscope apparatus 1 for industrial use is substantially identical to that according to the first embodiment. Like elements in the first embodiment are designated by like reference numerals. A duplicate description of these elements is omitted here.

That is, in the present embodiment, a plurality of protrusions 51 are provided at one side face of the endoscope main body 2, and the scope unit 4 (the insert portion 5, intermediate linking portion 6, and universal cable 7) is configured in a state of being wounded around these protrusions 91. Namely, these protrusions 91 function as an insert portion holding member which holds the scope unit 4 in a state in which the scope unit is wound.

With this configuration, the housing portion 18 can store at least the scope unit 4 to be wound around the protrusions 51 on one side face of the endoscope main body 2, and thus, the possibility of damaging the scope unit 4 removed from the endoscope housing case 3 is decreased, as in the first embodiment.

Figure 19A:
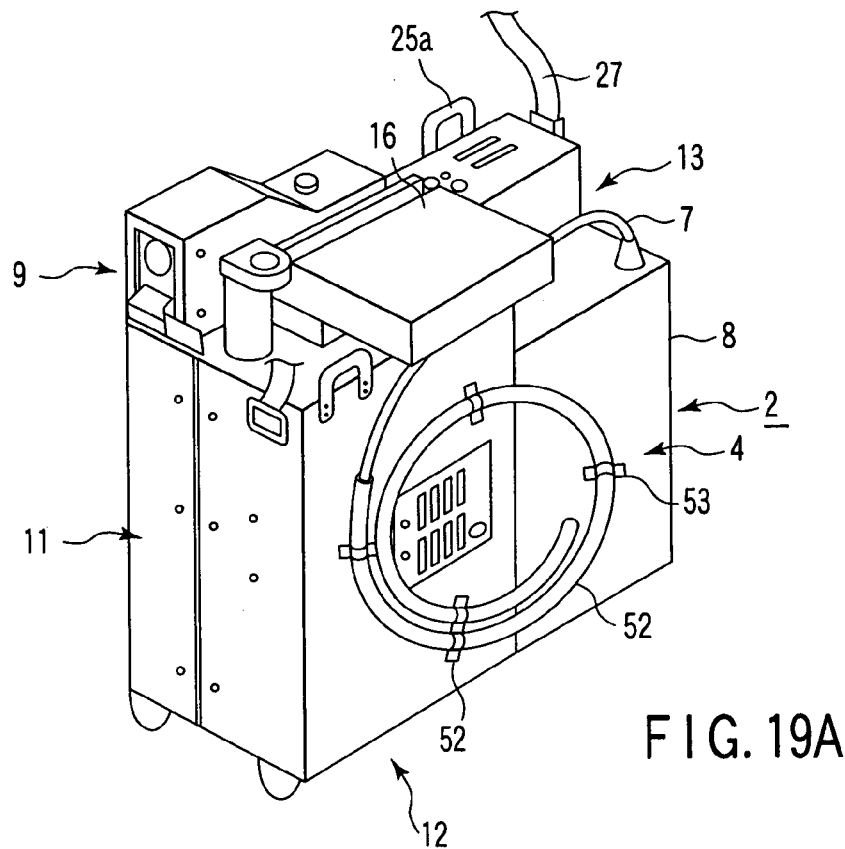
FIG. 19A is a perspective view of essential portions showing an endoscope apparatus for industrial use according to a third embodiment of the present invention.

FIG. 19A shows a third embodiment of the present invention. In the present embodiment, a configuration of the endoscope apparatus 1 for industrial use according to the first embodiment (refer to FIGS. 1 to 5) is changed as follows.

In the third embodiment, a tube 52 is fixed onto one side face of the endoscope main body 2 in a substantial spiral, and the scope unit 4 (the insert portion 5, intermediate linking portion 6, and universal cable 7) is configured to be stored after inserted into this tube 52. The tube 52 is fixed to one side face of the endoscope main body 2 by means of a plurality of fixing members 53 such as adhesive tape or fixing bracket.

In the above-described configuration as well, even without the endoscope housing case 3, the scope unit 4 can be housed to be inserted into the tube 52 on one side face of the endoscope main body 2, and thus, there is no danger of damaging the scope unit 4 removed from the endoscope housing case 3, as in the first embodiment.

Figure 19B:
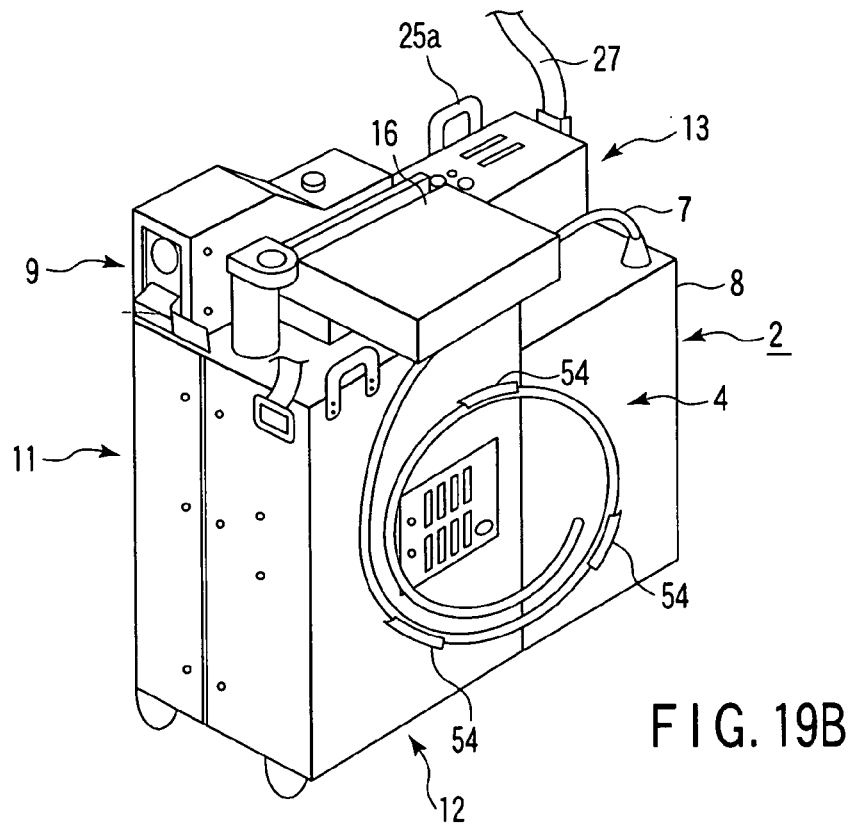
FIG. 19B is a perspective view of essential portions showing an endoscope apparatus for industrial use according to a fourth embodiment of the present invention.

FIG. 19B shows a fourth embodiment of the present invention. In the present embodiment, a configuration of the endoscope apparatus 1 for industrial use according to the first embodiment (refer to FIGS. 1 to 5) is changed as follows.

In the fourth embodiment, an endoscope receptacle member whose section is formed in a U shape is provided in plurality on one side face of the endoscope main body 2, and the scope unit 4 is configured to be housed after held between these endoscope receptacle members 54 in a state in which the scope unit 4 is bundled in a substantial spiral.

With such configuration, even without the housing portion 18, the scope unit 4 is housed to be held between the endoscope receptacle members 54 on one side face of the endoscope main body 2, and thus, the possibility of damaging the scope unit 4 from the endoscope housing case 3 is decreased as in the first embodiment.

Further, FIGS. 20A, 20B, and 20C are views each showing a use mode of an endoscope apparatus for industrial use according to the present invention.

In FIG. 20A, the endoscope main body 2 is removed from the endoscope housing case 3. The insert portion 4a and the universal cable 4c of the scope unit 4 shown in FIG. 15 are wound around the protrusion 91 which serves as an insert portion holding member provided at one side face of the endoscope main body. In particular, the operating portion 4b is fixed by using a fixing site (not shown).

The figure shows a state in which an operator 161 holds the empty endoscope housing case 3 in one hand, and hooks the endoscope main body 2 (including the scope unit 4) on the opposite shoulder, thereby transporting them.

In FIG. 20B, the scope unit 4 is housed in a box-shaped housing case 162 which serves as an insert portion holding member mounted integrally with the endoscope main body 2.

The figure shows a state in which the operator 161 holds the empty endoscope housing case 3 in one hand, and hangs the endoscope main body 2 (including the housing portion) on the opposite shoulder, thereby transporting them.

Further, FIG. 20C shows a state in which the endoscope case 3 is placed on a floor, and the endoscope main body 2 and the scope unit 4 are separated from each other. That is, the figure shows a state in which the operator 161 holds the endoscope main body 2 by hand or hangs it on a shoulder, and transports the housing case 162 which houses the scope unit 4 by hanging it on the other shoulder to a place where the operator can walk to.

Next, a fifth embodiment of the invention will be described.

Figure 21:
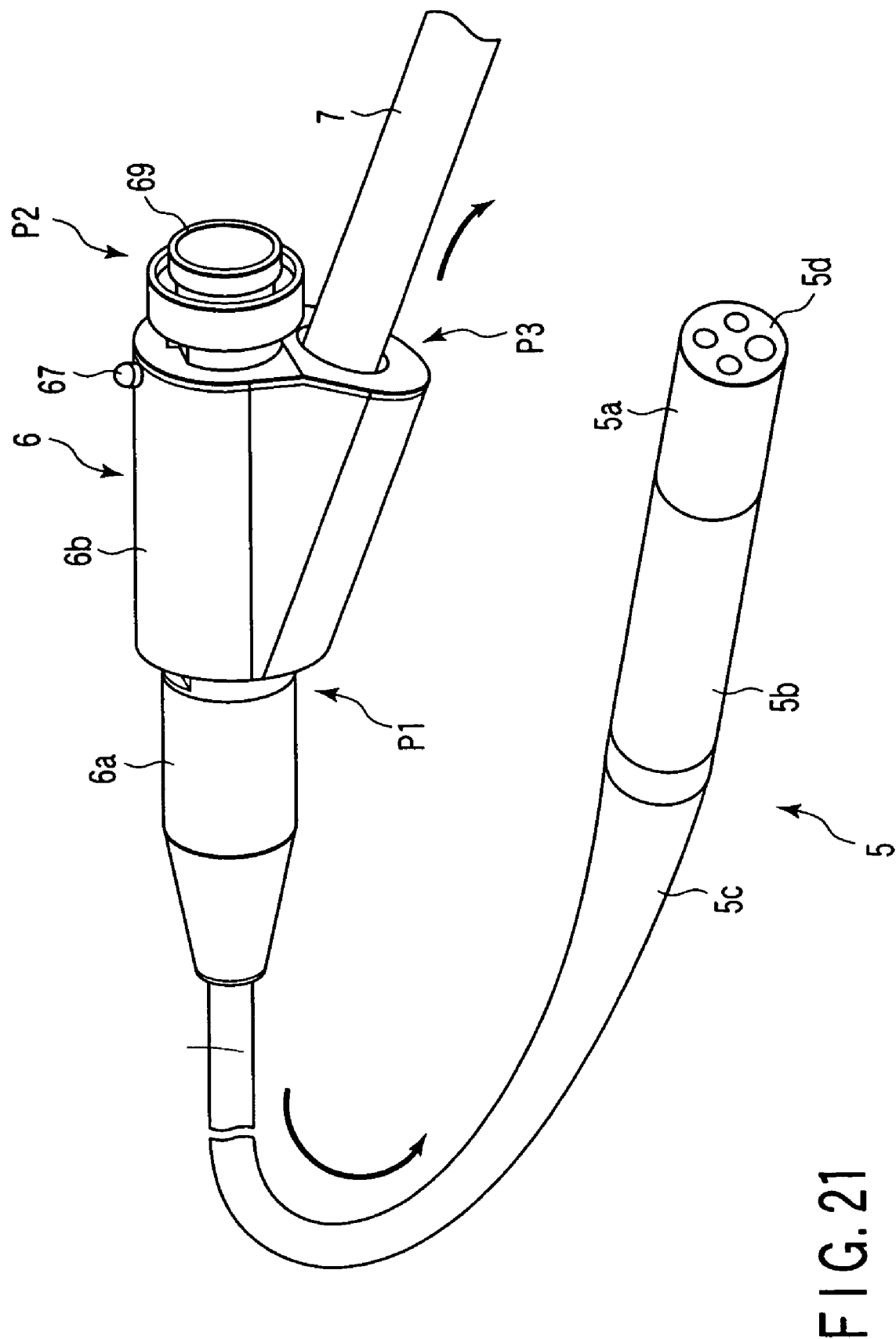
FIG. 21 is a schematic perspective view showing a scope unit of an endoscope apparatus according to a fifth embodiment of the present invention.
Figures 22A, 22B:
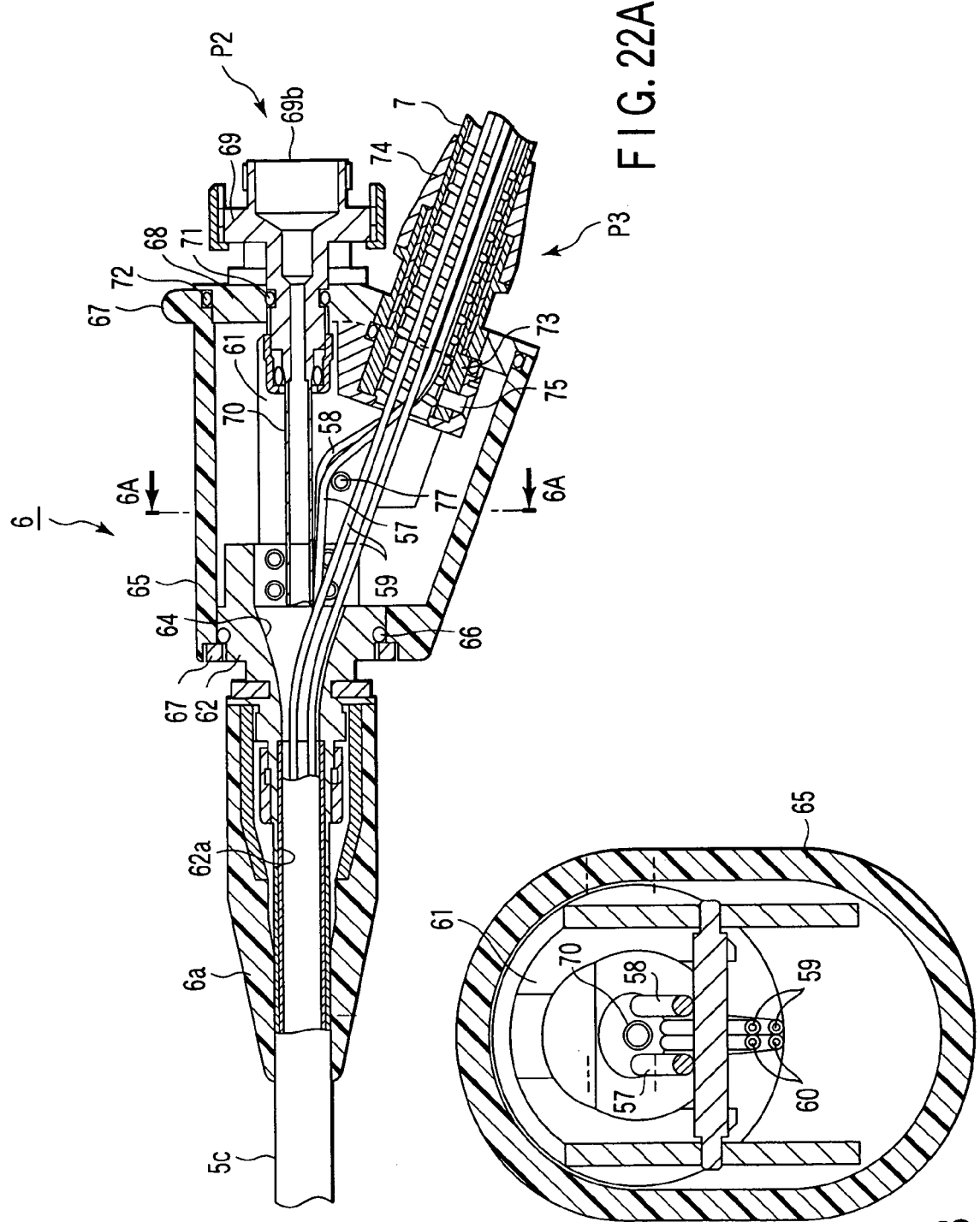
FIG. 22A is a longitudinal cross section of a channel port portion.
FIG. 22B is a sectional view taken along the line 6A—6A of FIG. 22A.

As shown in FIG. 22A, at the inside of the intermediate linking portion (channel port portion) 6, there are plural types of incorporated members, such as a light guide bundle (hereinafter, referred to as a "bundle") 57 for transmitting illumination light; a signal line (electrical cable) 58 connected to an observation optical system (for example, CCD); a coil sheath (angle coil) 59 described later; and a flexibly bending wire (angle wire) 60 for flexibly bending a flexible bending portion 5b (shown in FIG. 21) by pulling and releasing it, the flexibly bending wire being inserted into the coil sheath 59.

FIG. 22B is a view showing a section taken along the line 6A—6A shown in FIG. 22A.

As shown in FIG. 22B, it is preferable that the coil sheath 59 and flexibly bending wire 60 be disposed at a position orthogonal (at 90 degrees) to a center axis of the intermediate linking portion 6, and can be flexibly bent in four directions.

In addition, as shown in FIG. 21, an insert portion 5 is configured so that a distal end configuring portion 5a, a flexibly bending portion 5b, and a flexible tube portion 5c are disposed from the distal end side thereof. Among them, at an end face 5d of the distal end configuring portion 5a, for example, there are provided: an illumination light emitting window; an observation optical system window; and an opening of an internal channel (manipulating device inserting channel) arranged at the inside of the insert portion 5. In addition, the flexibly bending portion 5b is flexibly bent by remote operation, and the flexible tube portion 5c has flexibility.

It is preferable that this scope unit 4 be curled so that the inner periphery side of the insert portion 5 and universal cable 7 is easily curled by being pulled as compared with the outer periphery side, as shown in FIG. 21 at the time of manufacture or the like. This curling is produced by providing the residual stress and/or permanent strain of tension in the axial direction of the insert portion 5. When the scope unit 4 is used by extending it, this curling is produced to an extent such that it does not affect operation. Due to this curling, in the embodiments described previously, the scope unit 4 (the insert portion 5, intermediate linking portion 6, and universal cable 7) is easily bundled after being wound up.

In the present embodiment, during housing, a second port side described later, of the intermediate linking portion 6, is wound around the outside more easily than around a third port side. That is, in the case where the scope unit 4 is wound a plurality of times, a second port P2 is curled so as to be oriented more outwardly than a third port P3.

A description of the scope unit 4 will be given with reference to FIGS. 21, 22A, and 23A.

In this scope unit 4, a proximal end part of the insert portion 5 (flexible tube portion 5c) is linked with a distal end part of the intermediate linking portion 6. At the distal end part of this intermediate linking portion 6, a cylindrically shaped grip portion 6a for preventing breakage of the flexible tube portion 5c covers the outer periphery of the flexible tube portion 5c. This flexible tube portion 5c is adhesively bonded with the grip portion 6a, and cannot be removed.

The channel port section 6b is provided at the proximal end side of this grip portion 6a. This channel port section 6b has three ports. The grip portion 6a is connected to a first port P1. The second port P2 is oriented in an axial direction identical to that of the flexible tube portion 5c, and is inserted into an internal channel (not shown) arranged at the inside of the insert portion 5. The universal cable 7 is connected to the third port P3. The universal cable 7 is connected so as to be routed from the side direction into the axial direction of the first port P1. In the present embodiment, an angle formed by the axial direction of the flexible tube portion 5c and the axial direction of the universal cable 7 is produced as an obtuse angle (for example, about 150° to 160°). This angle is appropriately changed depending on a condition, such as full length of the scope unit 4 and the diameter of the insert portion 5 and universal cable 7. Namely, when the scope unit 4 is wound in a loop shape, a loop of the universal cable 7 is formed after being inclined, so as to be small relative to the insert portion 5.

A three-way shaped frame main body 61 is provided inside of the channel port section 6b. Of the three ports of this frame main body 61, a frontal base 62 is fixed at the first port P1 with screws 63a. The inside of this frontal base 62 is formed in a smooth collimation shape 64 (position restricting means) from the rear end side to the distal end side, and is further formed in a substantially straight shape relative to the distal end side.

A recessed portion 62a recessed by the thickness of the flexible tube portion 5c is formed such that an internal wall face at this distal end side smoothly connects with an internal wall face of the flexible tube portion 5c. Further, an O-ring 66 is provided at the boundary between a cover member 65 for covering the frame main body 61 and the frontal base 62, thereby preventing entry of liquid or the like into the frame main body. This cover main body 65 is mounted on the frontal base 62 by means of a metal ring screw 67, and is attached to the frame main body 61. The rear end of the cover member 65 is made of a resin material or a spring such as a rubber material, for example, and a protrusion 67 having shock absorption property is formed. The grip portion. 6a covers a connection portion between a distal end of the frontal base 62 and a proximal end of the flexible tube portion 5c.

At the second port P2 of the frame main body 61, a forceps base 69 is fixed with screws 63b via a support portion 68 so as to be along the axial direction of the flexible tube portion 5c. This forceps base 69 is collimated in a two-stepped manner so as to be small in diameter from a proximal end 69b to a distal end. A channel 70 communicating with the inside of the flexible tube portion 5c is formed at this forceps base 69. O-rings (sealing members) 71, 72 are provided respectively at a bonding portion between this forceps base 69 and the support portion 68 and a bonding portion between the support portion 68 and the cover member 65, thereby preventing entry of liquid or the like into the frame main body 61.

A breakage proof member is provided at the third port P3. This breakage proof member is configured in a state in which a cylindrically shaped breakage proof member 73 made of a metal material is adhesively bonded with a cylindrically shaped breakage proof member 74 made of a rubber material or resin material and connected to the rear end of this cylindrically shaped breakage proof member 73. The cylindrically shaped breakage proof member 73 is fixed to the frame main body 61 with screws 75, and the sealing by the O-ring 76 is applied. In addition, the distal end part at the inner periphery of this cylindrically shaped breakage proof member 73 is linked with the distal end part of the universal cable 7.

Further, a pin shaped support shaft 77 (position restricting means) is provided at a substantial center in the frame main body 61. This support shaft 77 restricts members (such as an LG bundle 57, a signal line 58, a coil sheath 59, and a flexibly bending wire 60) incorporated in the universal cable 7 so as to be proximal to the axial direction of the flexible tube portion 5c (in the axial direction of the first port P1 and the second port P2).

With respect to this support shaft 77, the signal line 58 and LG bundle 57 routed in the universal cable 7 are disposed so as to pass upwardly of this support shaft 77. On the other hand, the coil sheath 59 (flexibly bending wire 60) is arranged between a face of the collimation shape 64 of the above described frontal base 62 and the support shaft 77. That is, the coil sheath 59 is arranged so as to pass downward of the support shaft 77. Therefore, the coil sheath 59 (flexibly bending wire 60) and the incorporated member such as the signal line 58 and LG bundle 57 are restricted in movable distance (range) between the proximal end part of the insert portion 5 and the distal end part of the universal cable 7.

Although not shown, an operating portion for operating the flexibly bending portion 5b may be provided at the intermediate linking portion 6. In addition, the above described remote controller 20 may be formed so as to be connected to this intermediate linking portion 6.

Next, an operation of the endoscope apparatus 1 for industrial use will be described. Here, a description will be given with respect to a case in which the scope unit 4 is housed in the housing portion 18.

Figure 24:
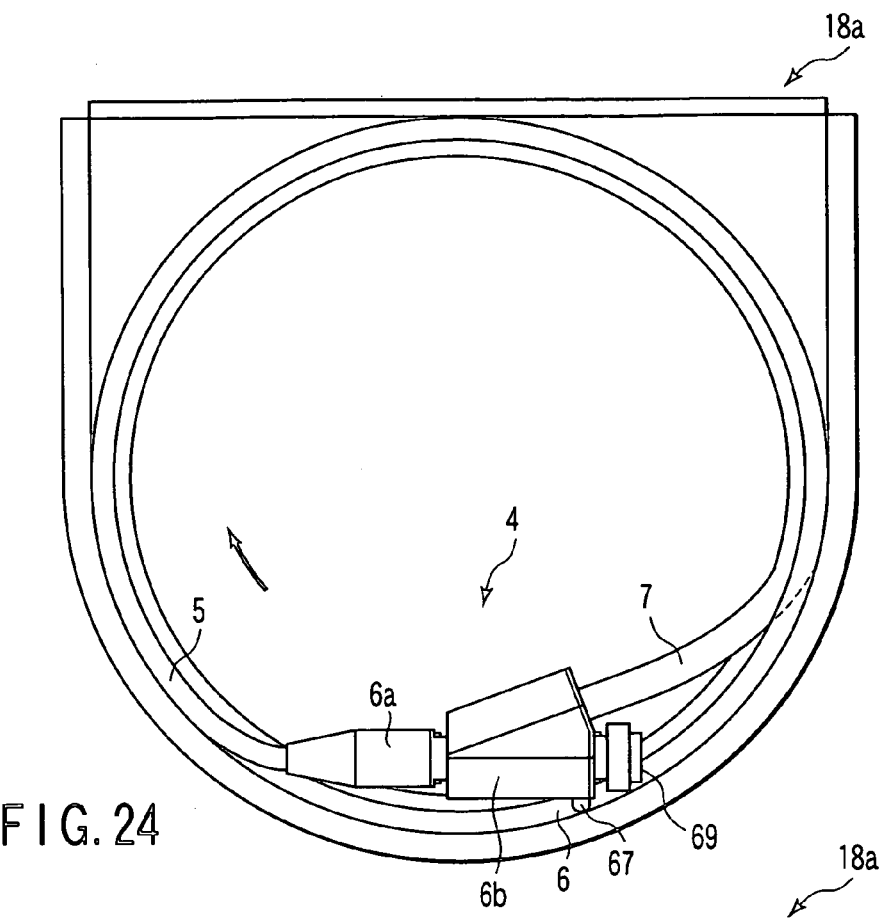
FIG. 24 is a perspective view showing a state in which a scope unit is housed in a scope housing portion.

As shown in FIG. 24, when the scope unit 4 is housed, a plurality of loops in diameter equal to those of the insert portion 5, the intermediate linking portion 6, and the universal cable 7 are continuously formed, thereby forming a housing state in which the centers of these loops are aligned with each other and are superimposed on each other. At this time, due to an effect of a curl (residual stress or permanent strain) which the previously described insert portion 5 and universal cable 7 have, the second port P2 of the channel port section 6b is disposed more outwardly than the third port P3.

Therefore, the scope unit 4 is formed in a substantially flat shape such that the thickness is small in a direction orthogonal to the radial direction of a loop, and is formed in a state (shape) in which the scope unit can be easily housed in the scope housing portion 18a. In such a housing state, the scope unit 4 is housed in the scope housing portion 18a. Then, the insert portion 5 and universal cable 7 come into contact with the inside face or arc-shaped lower face of the scope housing portion 18a due to their resistance force. Then, the insert portion and universal cable are housed so that they cannot move in the vertical and horizontal directions due to a frictional resistance relevant to the scope housing portion 18a.

In the fifth embodiment, although FIG. 24 shows an example when the scope unit 4 is wound in clockwise direction with respect to the apparatus main body 9, the winding direction may be in a counterclockwise direction, of course. It is desirable that the channel port section 6b be housed at the lowest part of the scope housing portion 18a, to which an excessive stress is not applied by gravity. However, no problem occurs even if the channel port section 6b is not disposed at the lowest part of the scope housing portion 18a.

The protrusion 77 provided at the side of the second port P2 of the channel port section 6b is abutted against the internal wall face of the scope housing portion 18a, and functions as a buffer member. As shown in FIG. 24, when the channel port section 6b is disposed at the lowest part of the scope housing portion 18a, the protrusion 77 absorbs vibration in the vertical direction so that the insert portion 5 or universal cable 7, as well as the channel port section 6b, cannot be damaged. The vibration in the horizontal direction abuts against the inside face of the scope housing portion 18a, and is absorbed by a frictional force with the scope housing portion 18a. In this manner, the insert portion 5 or universal cable 7 connected to the channel port portion 6b is not stressed or damaged. In the case where the protrusion 67 of the channel port section 6b abuts against the inside face of the scope housing portion 18a, the movement in the vertical direction of the channel port section 6b is restricted due to a frictional force with the scope housing portion 18a.

According to the fifth embodiment, the following advantageous effect is achieved.

First, even if a hard portion (intermediate linking portion 6) is present at the intermediate portion of the scope unit 4, the scope unit can be easily looped, and can be housed in the thin scope housing portion 18a.

In addition, the universal cable 7 is linked to be inclined with respect to the channel port section 6b, whereby the cable can be looped in small diameter. In this manner, the scope housing portion 18a can be thinly shaped, and a housing space can be reduced.

Figures 23A, 23B:
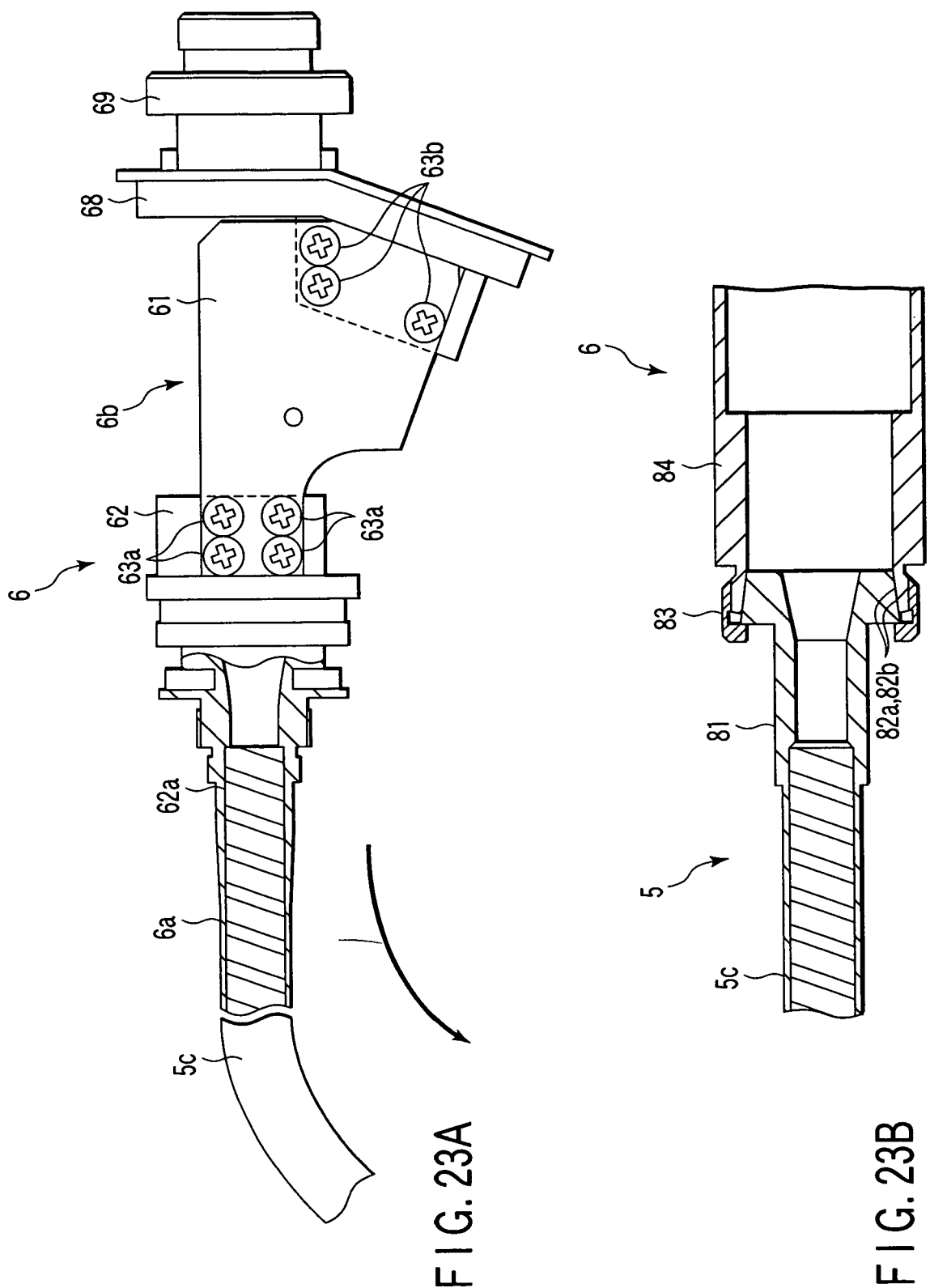
FIG. 23A is a perspective view showing a frame of the channel port portion.
FIG. 23B is a perspective view showing a frame of a channel port portion according to a prior art.

FIG. 23B shows an exemplary configuration in which an insert portion 5 is connected to an intermediate linking portion 84 in a prior art. As shown in FIG. 23B, a connecting member 81 is provided between the insert portion 5 and the intermediate linking portion 84. A distal end of the connecting member 81 has a breakage proof function of the proximal end part of the insert portion 5. A tapered portion 82a is formed at a proximal end part of the connecting member 81. A tapered portion 82b is formed at the distal end part of the intermediate linking portion 84 so as to come into close contact with the tapered portion 82a. Moreover, an engaging ring 83 is provided at the outer periphery of these tapered portions 82a, 82b, and the connecting member 81 and the intermediate linking portion 84 are linked with each other. With such a structure, the position in the peripheral direction can be freely changed. However, since the tapered portion 82b is formed, it is required to form the length in the axial direction to be greater by the tapered portion 82b in particular.

When the length in the axial direction is thus increased, an angle formed by the axial direction of the insert portion 5 and the axial direction of the universal cable 7 must be reduced in order to maintain a loop diameter equal to that according to the above-described embodiment during housing. However, in the embodiment, the lengths in the axial direction are formed to be as close to each other as possible by setting the angle formed by the axial direction of the insert portion 5 and the axial direction of the universal cable 7 to an obtuse angle.

Therefore, according to the scope unit 4 of the present embodiment, the length in the axial direction of the channel port section 6b can be formed to be shorter than conventionally, and the angle formed by the axial direction of the insert portion 5 and the axial direction of the universal cable 7 can be set to be greater.

Figure 25:
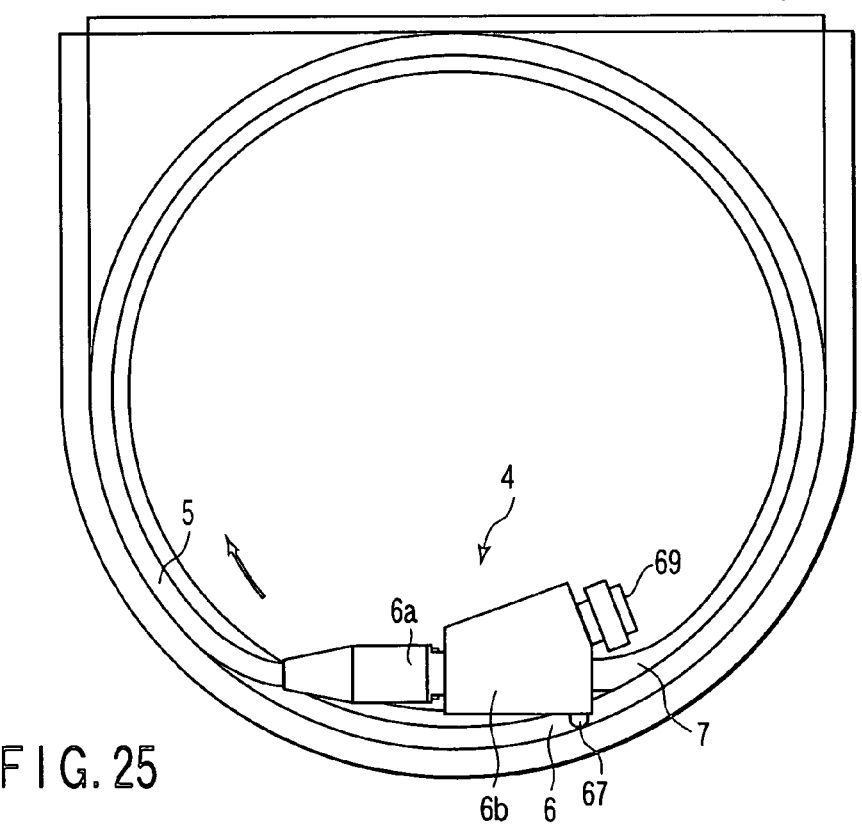
FIG. 25 is a schematic view showing a state of a modified example in which the scope unit shown in FIG. 24 is housed in the scope housing portion.

As shown in FIG. 25, the proximal end part of the insert portion 5 and the distal end part of the universal cable 7 may be such that the axial direction of the proximal end part of the insert portion 5 and the axial direction of the distal end part of the universal cable 7 are linearly held at the channel port section 6b. When the scope unit 4 is housed, it is preferable that the second port P2 having the forceps base 69 be positioned further inside than the third port P3 having the universal cable 7.

As has been described above, according to an endoscope apparatus of the present invention, An insert portion holding member for holding the insert portion is provided to be detachably mounted on the endoscope housing case together with the endoscope apparatus main body. Thus, the transport of the endoscope apparatus can be easily carried out. Even in the case where the insert portion is removed outside from the endoscope housing case, the insert portion is housed in the insert portion holding member, thus making it possible to prevent damage or the like. In this manner, the transport according to a place or usage can be carried out.

The insert portion holding member is attachable to/detachable from the endoscope main body, thus enabling transport according to a place or usage.

The scope unit section can be separated from the apparatus main body, thus enabling transport according to a place or usage.

The insert portion holding member is attachable to/detachable from the scope unit section, thus enabling transport according to a place or usage.

The insert portion can be housed in a state in which the endoscope main body is removed from the endoscope housing case.

An operating portion can be housed in addition to the insert portion.

The insert portion holding member is fixed to the endoscope main body, thus making it possible to easily hold the insert portion.

The insert portion can be housed to be inserted into a tube fixed to the endoscope main body in a state in which the endoscope main body is removed from the endoscope housing case.

The insert portion can be supported to be wound around a plurality of protrusions protruded at the endoscope main body in a state in which the endoscope main body is removed from the endoscope housing case.

Although the present invention has been specifically described by way of some embodiments, the invention includes all embodiments carried out without deviating from the spirit thereof, without being limited to these embodiments.

What is claimed is:

1. An endoscope apparatus comprising:
an elongated insert portion having flexibility, the insert portion adapted for insertion into at least a space targeted for inspection;

an endoscope main body having an apparatus main body used in combination with the insert portion;

a scope unit being linked with the apparatus main body via a connector portion having the insertion portion;

an insert portion holding member which houses the scope unit therein and includes mount member insert holes to allow mount members provided on a mount face of the apparatus main body to be removably engaged, and an endoscope housing case which houses the endoscope main body therein, the endoscope main body being attached to be integrated with the insert portion holding member, wherein the endoscope main body is housed in or removed from the endoscope housing case while the insert portion holding member is attached to be integrated with the endoscope main body.

2. The endoscope apparatus according to claim 1, wherein the insert portion holding member is provided detachably at the scope unit.

3. The endoscope apparatus according to claim 1, wherein the endoscope housing case is capable of housing an operating portion to operate the endoscope main body.

4. The endoscope apparatus according to claim 1, wherein the scope unit is composed of: an elongated insert portion having flexibility, the insert portion being inserted into at least a space targeted for inspection; an intermediate linking portion; and a universal cable.

5. The endoscope apparatus according to claim 1, wherein the scope unit is held at the intermediate linking portion in a state in which a proximal end part of the insert portion and a distal end part of the universal cable portion are inclined to each other such that an axis of the proximal end part of the insert portion crosses an axis of the distal end part of the universal cable portion.

6. The endoscope apparatus according to claim 1, wherein the scope unit comprises a manipulating device inserting channel in which the insert portion at one end is opened at a distal end part of the insert portion, and the insert portion at the other end is opened at a proximal end thereof, and the intermediate linking portion comprises a forceps inserting base connected to the manipulating device inserting channel and having an axis which is coincident with an axis of the manipulating inserting channel.

7. The endoscope apparatus according to claim 1, wherein the scope unit has a feature for achieving flexible bending in an identical direction due to an action of the residual stress or permanent strain, and can be formed in an annular shape of a substantially flat state due to winding of an equal diameter.

* * * * *